(12) United States Patent
Kawano et al.

(10) Patent No.: US 11,275,897 B2
(45) Date of Patent: Mar. 15, 2022

(54) INFORMATION PROCESSING APPARATUS, INFORMATION PROCESSING METHOD, AND PROGRAM FOR MODIFYING A CLUSTER SEGMENT RELATING TO A CHARACTER STRING GROUP

(71) Applicant: SONY CORPORATION, Tokyo (JP)

(72) Inventors: Shinichi Kawano, Tokyo (JP); Yuhei Taki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 192 days.

(21) Appl. No.: 16/096,370

(22) PCT Filed: Apr. 12, 2017

(86) PCT No.: PCT/JP2017/014928
§ 371 (c)(1),
(2) Date: Oct. 25, 2018

(87) PCT Pub. No.: WO2018/016140
PCT Pub. Date: Jan. 25, 2018

(65) Prior Publication Data
US 2019/0138601 A1 May 9, 2019

(30) Foreign Application Priority Data
Jul. 20, 2016 (JP) .............................. JP2016-142296

(51) Int. Cl.
*G06F 40/30* (2020.01)
*G06F 3/16* (2006.01)
(Continued)

(52) U.S. Cl.
CPC ................ *G06F 40/30* (2020.01); *G06F 3/16* (2013.01); *G06F 40/211* (2020.01); *G06F 40/289* (2020.01); *G10L 15/26* (2013.01)

(58) Field of Classification Search
CPC .................................................... G06F 3/0484
See application file for complete search history.

(56) References Cited

U.S. PATENT DOCUMENTS 3,654,609 A * 4/1972 Bluethman ............. G06F 3/153
358/1.18
3,654,611 A * 4/1972 Bluethman ............. G06F 3/153
358/1.18
(Continued)

FOREIGN PATENT DOCUMENTS

JP H05-290030 A 11/1993
JP H06-214585 A 8/1994
(Continued)

*Primary Examiner* — Matthew H Baker
(74) *Attorney, Agent, or Firm* — Paratus Law Group, PLLC

(57) ABSTRACT

There is provided an information processing apparatus, an information processing method, and a program that make it possible to modify a cluster segment relating to a character string group in an adaptive manner to the character string group to be acquired. The information processing apparatus includes: an acquisition unit that acquires a first character string group; and a modification unit that modifies a cluster segment relating to the first character string group on the basis of the first character string group and a predetermined condition.

20 Claims, 16 Drawing Sheets

(51) Int. Cl.
    *G06F 40/211*     (2020.01)
    *G06F 40/289*     (2020.01)
    *G10L 15/26*     (2006.01)

(56) References Cited

U.S. PATENT DOCUMENTS

| | | | | |
|---|---|---|---|---|
| 5,802,533 | A * | 9/1998 | Walker | G09B 5/065 |
| | | | | 715/201 |
| 6,279,018 | B1 * | 8/2001 | Kudrolli | G06F 40/284 |
| | | | | 715/234 |
| 10,515,138 | B2 * | 12/2019 | Walker | G06F 40/103 |
| 10,950,254 | B2 * | 3/2021 | Vaughn | G10L 15/22 |
| 2007/0157123 | A1 * | 7/2007 | Ikawa | G06F 40/274 |
| | | | | 715/816 |
| 2008/0294431 | A1 * | 11/2008 | Miyamoto | G10L 15/26 |
| | | | | 704/231 |
| 2010/0041000 | A1 * | 2/2010 | Glass | G09B 5/02 |
| | | | | 434/179 |
| 2010/0063815 | A1 * | 3/2010 | Cloran | G06Q 10/103 |
| | | | | 704/235 |

FOREIGN PATENT DOCUMENTS

| | | |
|---|---|---|
| JP | H09-240103 A | 9/1997 |
| JP | 2000-516002 A | 11/2000 |
| JP | 2001-100784 A | 4/2001 |
| JP | 2003-150298 A | 5/2003 |
| JP | 2015-184455 A | 10/2015 |

* cited by examiner

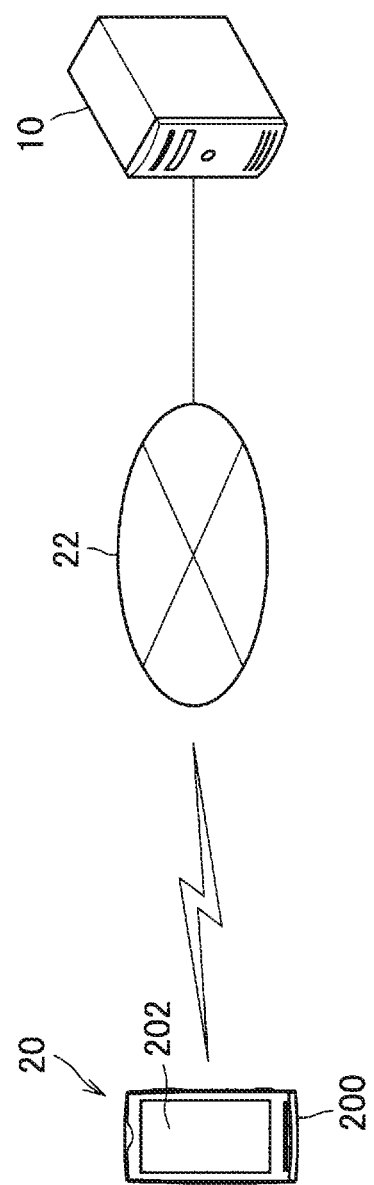

And while she's no longer with us, I know my grandmother's watching, along with the family that made me who I am.
I miss them tonight. I know that my debt to them is beyond measure.
To my sister Maya, my sister Alma, all my other brothers and sisters, thank you so much for all the support that you've given me.
. . . . . .

| And while she's | no longer | with us | I know |
| my grandmother's | watching | along with the family | |
| that made me | who I am | I miss | them |
| tonight | . . . | | |

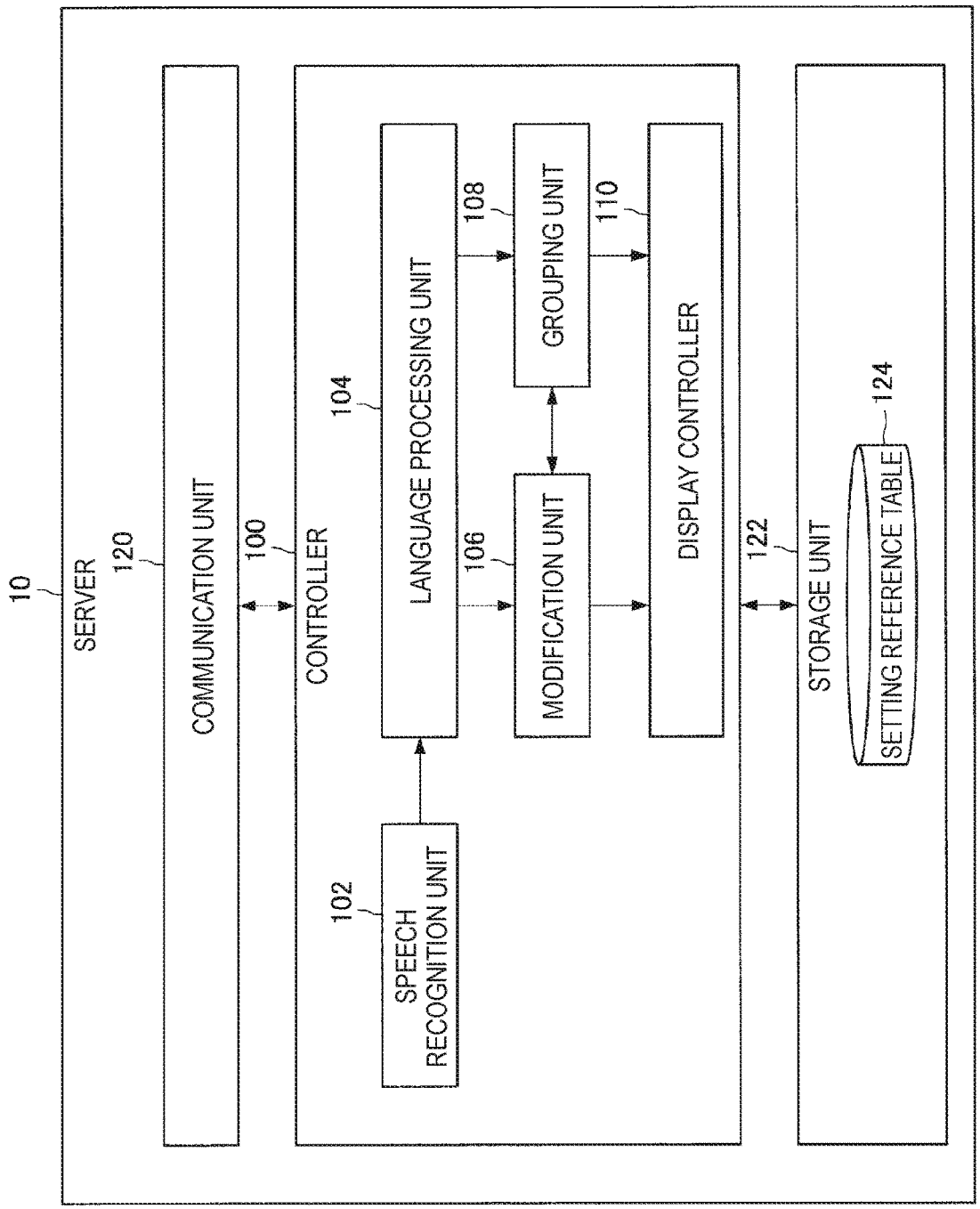

FIG. 8
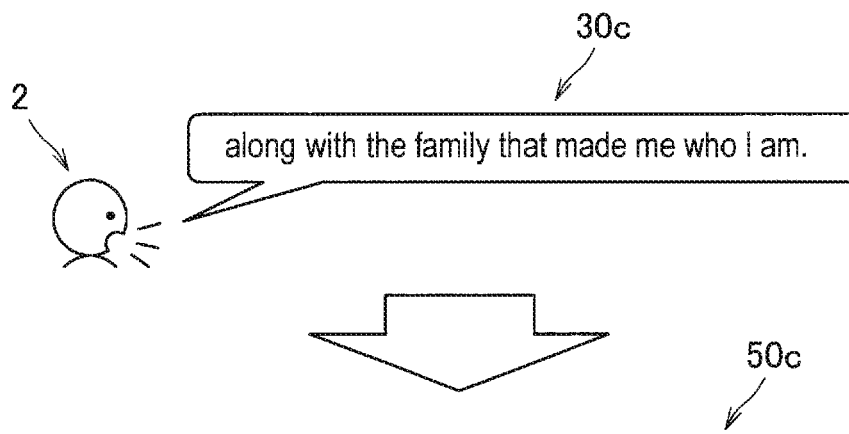
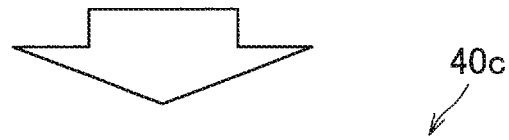

FIG. 11
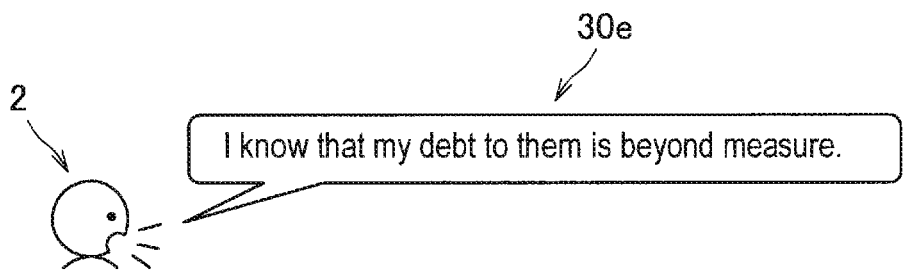
And while she's no longer with us, I know my grandmother's watching, along with the family that made me who I am. I miss them tonight.
I know that my debt to them is beyond measure.
| And while she's no longer | with us | I know |
| my grandmother's watching | along with the family | |
| that made me who I am | I miss them tonight | |
| I know that my debt to them | is beyond measure | |
402

FIG. 12
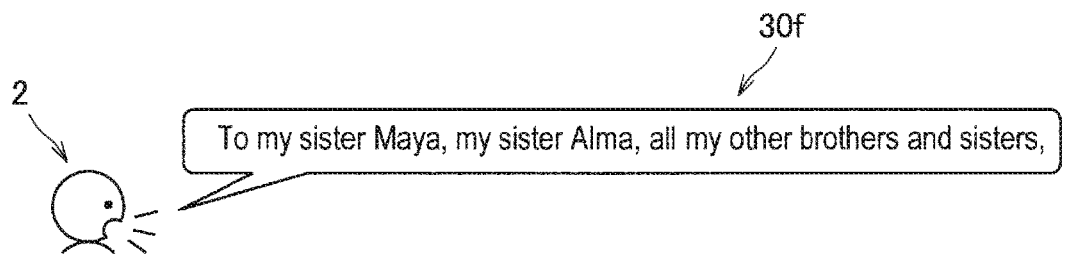
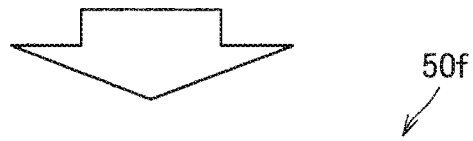
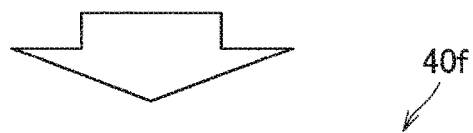
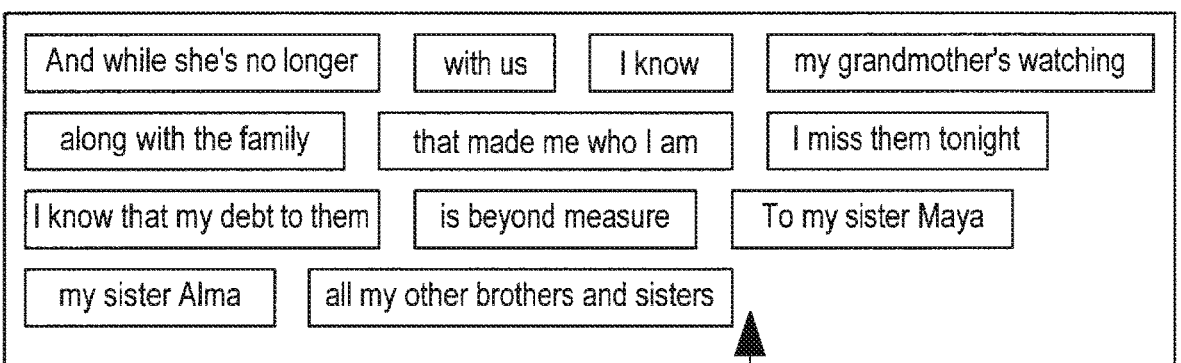

INFORMATION PROCESSING APPARATUS, INFORMATION PROCESSING METHOD, AND PROGRAM FOR MODIFYING A CLUSTER SEGMENT RELATING TO A CHARACTER STRING GROUP

CROSS REFERENCE TO PRIOR APPLICATION

This application is a National Stage Patent Application of PCT International Patent Application No. PCT/JP2017/014928 (filed on Apr. 12, 2017) under 35 U.S.C. § 371, which claims priority to Japanese Patent Application No. 2016-142296 (filed on Jul. 20, 2016), which are all hereby incorporated by reference in their entirety.

TECHNICAL FIELD

The present disclosure relates to an information processing apparatus, an information processing method, and a program.

BACKGROUND ART

Conventionally, various technologies relating to natural language processing have been proposed. For example, a technology of analyzing individual terms included in an inputted character string and a technology of analyzing a grammatical structure of the character string have been proposed.

Further, in Patent Literature 1 below, a technology of drafting a sentence on the basis of words and phrases selected by a user from among a plurality of words and phrases has been disclosed.

CITATION LIST

Patent Literature

Patent Literature 1: JP 2012-53634A.

DISCLOSURE OF INVENTION

Technical Problem

Incidentally, it is desired that, for example, an inputted character string group be grouped into a plurality of clusters. However, with the conventional technologies, the character string group is grouped on the basis of fixed segments without regard to character string group to be acquired.

Accordingly, the present disclosure proposes a novel and improved information processing apparatus, an information processing method, and a program that make it possible to modify a cluster segment relating to a character string group in an adaptive manner to the character string group to be acquired.

Solution to Problem

According to the present disclosure, there is provided an information processing apparatus including: an acquisition unit that acquires a first character string group; and a modification unit that modifies a cluster segment relating to the first character string group on the basis of the first character string group and a predetermined condition.

In addition, according to the present disclosure, there is provided an information processing method including: acquiring a first character string group; and modifying, by a processor, a cluster segment relating to the first character string group on the basis of the first character string group and a predetermined condition.

In addition, according to the present disclosure, there is provided a program that causes a computer to function as: an acquisition unit that acquires a first character string group; and a modification unit that modifies a cluster segment relating to the first character string group on the basis of the first character string group and a predetermined condition.

Advantageous Effects of Invention

As described above, according to the present disclosure, it is possible to modify a cluster segment relating to a character string group in an adaptive manner to the character string group to be acquired. Moreover, the effects described herein are not necessarily limited, and any of the effects described in the present disclosure may be applied.

BRIEF DESCRIPTION OF DRAWINGS

FIG. 1 is a diagram describing a configuration example of an information processing system according to an embodiment of the present disclosure.

FIG. 2 is a diagram illustrating an example of a character string group that is inputted by a user.

FIG. 3 is a diagram illustrating a display example of cluster segments that are determined in relation to the character string group illustrated in FIG. 2, in a comparative example of the present disclosure.

FIG. 4 is a functional block diagram illustrating a configuration example of a server 10 according to an embodiment of the present disclosure.

FIG. 8 is a diagram describing a portion of an application example of an embodiment of the present disclosure.

FIG. 11 is a diagram describing a portion of an application example of an embodiment of the present disclosure.

FIG. 12 is a diagram describing a portion of an application example of an embodiment of the present disclosure.

MODE(S) FOR CARRYING OUT THE INVENTION

Figure 5:
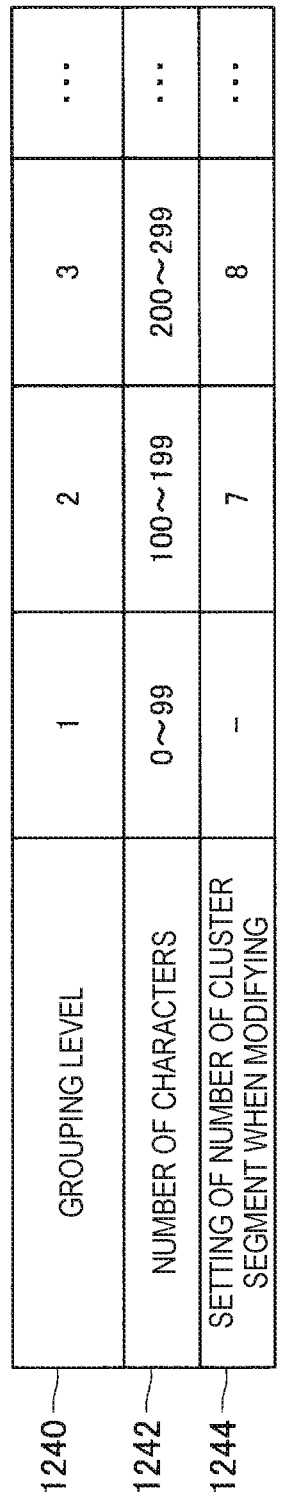
FIG. 5 is a diagram describing a configuration example of a setting reference table 124 according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, there are cases in the present specification and the diagrams in which a plurality of components having substantially the same functional configuration are distinguished from each other by affixing different letters to the same reference numbers. In one example, a plurality of components having substantially identical functional configuration are distinguished, like servers 10a and 10b, if necessary. However, when there is no particular need to distinguish a plurality of components having substantially the same functional configuration from each other, only the same reference number is affixed thereto. In one example, when there is no particular need to distinguish servers 10a and 10b, they are referred to simply as an server 10.

Further, the "Mode(s) for carrying out the invention" will be described according to the order of the items listed below.
1. Configuration of Information Processing System
2. Detailed Description of Embodiment
3. Hardware Configuration
4. Modification Example

CONFIGURATION OF INFORMATION PROCESSING SYSTEM

First, a description is given, with reference to FIG. 1, of a configuration of an information processing system according to an embodiment of the present disclosure. As illustrated in FIG. 1, the information processing system includes a server 10, a terminal 20, and a communication network 22.

1-1. Terminal 20

The terminal 20 is an information processing terminal used by a user. For example, the terminal 20 is able to collect speeches when the user speaks and receive an input of a character string. As illustrated in FIG. 1, terminal 20 includes, for example, a sound collection unit 200 and an operation display unit 202.

The sound collection unit 200 is, for example, a microphone. The sound collection unit 200 detects external sounds (aerial vibration), and converts them into electric signals.

The operation display unit 202 includes a display unit that display a display screen and an operation unit that detects a touch operation by the user. The display unit includes, for example, an LCD (Liquid Crystal Display) device and an OLED (Organic Light Emitting Diode) device. Further, the operation unit includes, for example, a touch panel. For example, the operation display unit 202 receives an input of a character string group by the user. As an example, the operation display unit 202 displays a software keyboard, and thereafter, receives an input of a character string group by a touch operation on the software keyboard. Here, the character string group is one or more character strings.

Further, the terminal 20 is able to communicate with other devices via communication network 22. For example, the terminal 20 transmits, to the server 10 via the communication network 22, speech data collected by the sound collection unit 200, a character string group that is inputted to the operation display unit 202, and the like.

It is to be noted that the terminal 20 may be connected to an input device (for example, a keyboard, a remote controller, and the like) (unillustrated) in a wired manner or wirelessly. In this case, the terminal 20 is also able to transmit, to the server 10, a character string group that is manually inputted (for example, key input) by the user using the input device.

It is to be noted that an example in which the terminal 20 is a smartphone is illustrated in FIG. 1. However, this is not limitative. For example, the terminal 20 may be a general-purpose PC (Personal Computer), a tablet-type terminal, a gaming machine, a telephone device other than smartphone, a portable-type music player, a television receiver, a robot, or, for example, an HMD (Head Mounted Display), a headset, or a wearable device such as a smartwatch.

1-2. Server 10

The server 10 is an example of the information processing apparatus according to the present disclosure. The server 10 has a natural language processing function. For example, the server 10 is able to perform speech recognition (cloud speech recognition) on speech data that are received from the terminal 20 via the communication network 22 that is described later. Further, the server 10 is able to perform various types of language processing on the character string group that is received from the terminal 20 via the communication network 22 and the character string group that is acquired from a speech recognition result.

Further, the server 10 is able to determine one or more cluster segment (hereinafter, referred to as "cluster segment") in relation to the character string group on the basis of a result of language processing performed on the character string group. Here, the cluster segment includes one or more characters. For example, the cluster segment may include one or more terms. More specifically, in a case where language is English, German, etc., the cluster segment may include one or more words, while in a case where language is Japanese, the cluster segment may include one or more phrases.

Further, the server 10 is able to perform various types of control such as display control to the terminal 20. For example, the server 10 causes the terminal 20 to display the character string group by dividing the display into each of the cluster segments that are determined in relation to the character string group.

1-3. Communication Network 22

The communication network 22 is a wired or wireless transmission path for information that is transmitted from a device connected to the communication network 22. For example, the communication network 22 may include a telephone line network, the internet, a public line network such as a satellite communication network, various types of LAN (Local Area Network) such as Ethernet (Registered Trademark), WAN (Wide Area Network), and the like. Further, the communication network 22 may include a dedicated line network such as IP-VPN (Internet Protocol-Virtual Private Network).

1-4. Summary of Issue

A description is given, as described above, of the configuration of the information processing system according to the present embodiment. Incidentally, for example, a case such as meeting minutes or a novel is also assumed in which a character string group including a large number of characters is inputted to the terminal 20. In such a case, in a case where the cluster segments (for example, size, etc.) are set in a fixed manner, an issue arises in which visibility of an entire character string is reduced when displaying the cluster segments that are acquired from the character string group.

Here, with reference to FIGS. 2 and 3, the above-described content are described in more detail. For example, a character string group 30 as illustrated in FIG. 2 is inputted by a user by way of a speech input or a manual input. It is to be noted that the character string group 30 (English sentences) illustrated in FIG. 2 is a portion of the transcript of "Speech from Mr. Barak Obama, Nov. 4, 2008" ("Transcript: 'This is your victory', says Obama", CNN.com 2008. <http://edition.cnn.com/2008/POLITICS/11/04/obama.transcript/>).

In this case, as illustrated in FIG. 3, for example, a plurality of cluster segments 400 are determined on the basis of a result of language processing performed on the character string group 30, and are displayed on the display screen 40. However, the character string group 30 is long. Therefore, in a case where the cluster segments 400 are set in a fixed manner, a large number of the cluster segments 400 are displayed on the display screen 40. As a result, the user may recognize that the individual cluster segments are relatively small. Therefore, it becomes difficult for the user to visually recognize the entire character string group.

In this respect, the server 10 according to the present embodiment has been devised, with the above-described circumstance as an essential point of view. The server 10 according to the present embodiment dynamically modifies, on the basis of a predetermined condition, the cluster segment(s) relating to an acquired character string group. For example, the server 10 is able to sequentially optimize the cluster segment(s) in accordance with the total volume of the character string group (for example, the number of characters, an estimated number of cluster segments, and the like).

2. DETAILED DESCRIPTION OF EMBODIMENT

2-1. Configuration

Next, a description is given in detail of a configuration according to the present embodiment. FIG. 4 is a functional block diagram illustrating a configuration example of the server 10 according to the present embodiment. As illustrated in FIG. 4, the server 10 includes a controller 100, a communication unit 120, and a storage unit 122.

2-1-1. Controller 100

The controller 100 integrally controls the operation of the server 10 with use of hardware such as a later-described CPU (Central Processing Unit) 150 and a later-described RAM (Random Access Memory) 154 that are built in the server 10. Further, in FIG. 4, the controller 100 includes a speech recognition unit 102, a language processing unit 104, a modification unit 106, a grouping unit 108, and a display controller 110.

2-1-2. Speech Recognition Unit 102

The speech recognition unit 102 performs speech recognition on speech data to be received from, for example, the terminal 20, and converts the speech data into a character string group. Further, the speech recognition unit 102 transmits the converted character string group to the language processing unit 104.

2-1-3. Language Processing Unit 104

The language processing unit 104 is an example of the acquisition unit according to the present disclosure. The language processing unit 104 acquires a character string group transmitted from the speech recognition unit 102 or a character string group received from the terminal 20. Thereafter, the language processing unit 104 performs various types of language processing (for example, morphological analysis, syntax analysis, semantic analysis, and the like) on the acquired character string group. For example, the language processing unit 104 first performs morphological analysis on the acquired character string group. The language processing unit 104 next performs syntax analysis of the character string group on the basis of a result of the morphological analysis. The language processing unit 104 performs, for example, analysis of the syntactic relationship between words (in the case of English language) or between phrases (in the case Japanese language) included in the character string group. Thereafter, the language processing unit 104 performs semantic analysis of the character string group on the basis of a result of the syntax analysis. The language processing unit 104 performs, for example, analysis of modality included in the character string group.

Further, the language processing unit 104 transmits the acquired character string group and the result of language processing to the modification unit 106, the grouping unit 108, and the storage unit 122.

2-1-4. Modification Unit 106

2-1-4-1. Modification Determination of Cluster Segment

The modification unit 106 is an example of the modification unit according to the present disclosure. The modification unit 106 determines a cluster segment relating to an acquired character string group on the basis of a predetermined condition. Here, the predetermined condition may include a plurality of conditions that differ from each other (a plurality of conditions that do not overlap with each other). It is to be noted that specific examples of the predetermined conditions are described later.

Determination Example 1

For example, in a case where a character string group is newly acquired, the modification unit 106 determines, on the basis of which condition among the plurality of conditions a character string group that has been acquired in the past (hereinafter, referred to as "character string group before modification") satisfies, whether or not to modify cluster segments of the character string group before modification. Alternatively, in this case, the modification unit 106 determines, on the basis of which condition among the plurality of conditions a character string group to which the newly acquired character string group is added to the character string group before modification (hereinafter, referred to as "character string group after modification") satisfies, whether or not to modify the cluster segments of the character string group before modification. Here, the character string group before modification is an example of a first character string group according to the present disclosure. Further, the newly acquired character string group is an example of a second character string group according to the present disclosure. Further, the character string group after modification is an example of a third character string group according to the present disclosure.

For example, the modification unit 106 compares a condition that is satisfied by the character string group before modification among the plurality of conditions with a condition that is satisfied by the character string group after modification (among the plurality of conditions) to thereby determine whether or not to modify the cluster segment(s) of the character string group before modification. In more details, in a case where the condition satisfied by the character string group before modification differs from the condition satisfied by the character string group after modification, the modification unit 106 determines to modify the cluster segment(s) of the character string group before modification. Further, in a case where the condition satisfied by the characteristic string group before modification is the same as the condition satisfied by the character string group after modification, the modification unit 106 determines not to modify the cluster segment(s) of the character string group before modification.

In addition, each time the character string group is newly acquired, the modification unit 106 sequentially compares the condition satisfied by the character string group that has been acquired in the past earlier than the acquisition of the new character string group (i.e. the character string group before modification) with the condition satisfied by the character string group after the addition of the newly acquired character string group (i.e. the character string group after modification) to determine whether or not these character string groups are the same, and, thereafter, determines whether or not to modify the cluster segments of the character string group before modification.

Determination Example 2

Additionally, in a case where editing information with respect to the character string group that has been already acquired (character string group before modification) is acquired, the modification unit 106 is also able to compare the condition satisfied by the character string group before modification with the condition satisfied by the character string group in which the character string group before modification has been modified on the basis of the editing information (i.e. the character string group after modification) to thereby determine whether or not to modify the cluster segments of the character string group before modification. Here, the editing information may refer to information relating to an insertion of a predetermined sign (for example, ",", ".", "?", and the like) to a relevant character string group, information relating to a deletion of a portion of the relevant character string group, and the like.

Condition Example 1: Number of Characters

Here, a description is given of specific examples of the above-described predetermined conditions. For example, the predetermined conditions may include a plurality of conditions relating to a range of the number of characters included in the character string group. For example, the plurality of conditions may include condition A1, condition A2, condition A3, and the like. The condition A1 may be defined as "the number of characters (included in the character string group) is no less than 0 and less than 100". The condition A2 may be defined as "the number of characters is no less than 100 and less than 200". The condition A3 may be defined as "the number of characters is no less than 200 and less than 300". In this case, in a case where the condition satisfied by the character string group before modification differs from the condition satisfied by the character string group after modification and the number of characters included in the character string group after modification is greater than the number of characters included in the character string group before modification, the modification unit 106 determines to make large (modify) the cluster segment(s) before modification.

It is to be noted that each of the plurality of conditions and a threshold (for example, a lower limit value of a range of the number of characters in each condition) may be associated with each other and registered in a table. In this case, the modification unit 106 may compare each of the number of characters included in the character string group before modification (or after modification) with the threshold associated with each condition, to thereby specify a condition satisfied by the character string group before modification (or after modification). For example, the threshold of the condition A1 is registered as "0", the threshold of the condition A2 is registered as "100", and the threshold of the condition A3 is registered as "200", and the number of characters included in the character string group before modification is "80". In this case, the number of characters included in the character string group is no less than the threshold of the condition A1 and smaller than the threshold of the condition A2. Therefore, the modification unit 106 may specify the condition satisfied by the character string group as the condition A1.

Condition Example 2: Number of Cluster Segments

Additionally, the predetermined conditions may include the plurality of conditions relating to the number of cluster segments of the character string group. For example, the plurality of conditions may be defined as including a condition B1 and a condition B2, the condition B1 being "the number (or an estimated number) of cluster segments of the character string group is less than 10", and the condition B2 being "the number (or an estimated number) of cluster segments of the character string group is no less than 10". In this case, in a case where the condition satisfied by the character string group before modification differs from the condition satisfied by the character string group after modification, and the number of cluster segments of the character string group after modification is greater than the number of cluster segments of the character string group before modification, the modification unit 106 determines to make large (modify) the cluster segments) of the character string group before modification.

It is to be noted that the number of cluster segments of the character string group after modification may be calculated as below. For example, regarding a case where a character string group is newly acquired, the number of cluster segments of the character string group after modification is calculated as the sum of an estimated number of cluster segments in a case of grouping the newly acquired character string group with use of a present setting reference and the number of cluster segments of the character string group before modification. Further, regarding a case where the character string group is deleted, the number of cluster segments of the character string group after modification is the number of cluster segments that remains after the deletion. It is to be noted that the above-described setting reference may be, for example, a limiting condition relating to the number of cluster segments relating to the character string group (for example, the number of cluster segments is no greater than 10), or alternatively, may be a limiting condition relating to the number of characters included in a cluster segment (for example, no greater than 20 characters).

Condition Example 3: Language Processing Result

Additionally, the predetermined conditions may include a plurality of conditions relating to a language processing result relating to the character string group. Here, the language processing result is, for example, the number of specific "clauses" (for example, a noun phrase), the number of specific "parts of speech" (for example, a noun), the number of independent words (in the case of Japanese language), or the like, that are analyzed on the basis of a relevant character string group. For example, the plurality of conditions may include condition C1, condition C2, condition C3, and the like. In addition, the condition C1 may be defined as "the number of nouns (included in the character string group) is no less than 0 and less than 10", the condition C2 may be defined as "the number of nouns are no less than 10 and less than 20", and the condition C3 may be defined as "the number of nouns are no less than 20 and less than 30. In this case, in a case where the condition satisfied by the character string group before modification differs from the condition satisfied by the character string group after modification, and the number of nouns included in the character string group after modification is greater than the number of nouns included in the character string group before modification, the modification unit 106 determines to make large (modify) the cluster segment(s) of the character string group before modification. In accordance with this condition example, the cluster segment(s) may be made larger as the amount of information of the character string group is greater. Accordingly, it becomes possible to reflect the amount of the information of the character string group to thereby group the character string group.

Condition Example 4: Number of Phonemes

Additionally, the predetermined conditions may include a plurality of conditions relating to the number of phonemes that corresponds to the character string group. For example, the plurality of conditions may include condition D1, condition D2, condition D3, and the like. In addition, the condition D1 may be defined as "the number of phonemes (corresponding to the character string group) is no less than 0 and less than 80", the condition D2 may be defined as "the number of phonemes is no less than 80 and less than 160", and the condition D3 may be defined as "the number of phonemes is no less than 160 and less than 240". In this case, in a case where the condition satisfied by the character string group before modification differs from the condition satisfied by the character string group after modification, and the number of phonemes that corresponds to the character string group after modification is greater than the number of phonemes that corresponds to the character string group before modification, the modification unit 106 determines to make large (modify) the cluster segment(s) of the character string group before modification. It is to be noted that the number of phonemes may be specified on the basis of the speech recognition result that corresponds to a relevant character string group, or may be specified on the basis of the language processing result with respect to the relevant character string group.

Condition Example 5: Modality

Additionally, the predetermined conditions may include a plurality of conditions relating to modality that is analyzed on the basis of the character string group. For example, the plurality of conditions are a plurality of conditions relating to a range of the number of pieces of modality that are analyzed on the basis of the character string group. As an example, the plurality of conditions may include condition E1, condition E2, condition E3, and the like. In addition, the condition E1 may be defined as "the number of pieces of modality (analyzed on the basis of the character string group) is 0", the condition E2 may be defined as "the number of pieces of modalities is 1", and the condition E3 may be defined as "the number of pieces of modalities is 2". In this case, in a case where the condition satisfied by the character string group before modification differs from the condition satisfied by the character string group after modification, and the number of pieces of modality that is analyzed on the basis of the character string group after modification is greater than the number of pieces of modality that is analyzed on the basis of the character string group before modification, the modification unit 106 determines to make large (modify) the cluster segment(s) of the character string group before modification. It is to be noted that the type of modality of a target may be any type, or may be a specific type.

Condition Example 6: Editing Information of User

Additionally, the predetermined conditions may include a condition relating to a presence or absence of editing information of a user. For example, the predetermined conditions may be "the editing information of the user has been acquired, and a relevant character string group has been modified on the basis of the editing information". In this case, in a case where the character string group after modification satisfies the predetermined condition, the modification unit 106 determines to modify the cluster segment(s) of the character string group before modification in accordance with the editing information. It is to be noted that the content of the editing information may be similar to the above-described descriptions.

Combination of Conditions

Additionally, the predetermined conditions may include the above-described plurality of types of conditions. In this case, in a case where, regarding the plurality of types of conditions, a combination of the conditions satisfied by the character string group before modification differs from a combination of the conditions satisfied by the character string group after modification, the modification unit 106 may determine to modify the cluster segments of the character string group before modification. Further, in a case where the combination of the conditions satisfied by the character string group before modification is the same as the combination of the conditions satisfied by the character string group after modification, the modification unit 106 may determine not to modify the cluster segment(s) of the character string group before modification.

For example, the plurality of conditions includes a plurality of conditions relating to a range of the number of characters included in the character string group and a plurality of conditions relating to the number of the cluster segments relating to the character string group. In addition, the number of characters of the character string group before modification is "80", the number of the cluster segments of the character string group before modification is "9", the number of characters of the character string group after modification is "95", and the number of the cluster segments of the character string group after modification (in a case where a newly acquired character string group is grouped with use of a present setting reference) "11". In this case, a combination of the conditions satisfied by the character string group before modification is (the condition A1, the condition B1). Further, a combination of the conditions satisfied by the character string group after modification is (the condition A1, the condition B2). Therefore, both combinations are different from each other. Accordingly, the modification unit 106 determines to modify (make large) the cluster segment(s) of the character string group before modification.

(2-1-4-2. Modification of Setting Reference Relating to Cluster Segment(s))

Furthermore, in a case of determining to modify the cluster segment(s), the modification unit 106 modifies a present setting reference relating to the cluster segment(s) that is stored in, for example, a storage unit 122, in accordance with a modified content of the cluster segment(s).

For example, a setting reference table 124 may be provided in which the above-described plurality of conditions are associated with a setting reference relating to the cluster segment(s). In this case, in a case of determining to modify the cluster segment(s), the modification unit 106 may modify (the present setting reference) to a setting reference that is associated with a condition satisfied by the character string group after modification in the setting reference table 124 and update the content of the storage unit 122.

FIG. 5 is a diagram illustrating a configuration example of the setting reference table 124. As illustrated in FIG. 5, in the setting reference table 124, a grouping level 1240, a condition 1242, and a setting reference 1244 are associated with one another, for example. It is to be noted that FIG. 5 illustrates an example in which the condition 1242 is a plurality of conditions relating to a range of the number of characters included in a character string group. Further, FIG. 5 illustrates an example in which the setting reference 1244 is a setting reference (a limiting condition) relating to the number of the cluster segment(s) at the time of modifying the cluster segment(s). In the example illustrated in FIG. 5, in a case where the number of characters included in the character string group after modification is "no less than 100 and no greater than 199", and the cluster segment(s) are determined to be modified, the modification unit 106 modifies the present setting reference to the setting reference in which the grouping level is "2" (in other words, the setting reference in which the number of the cluster segments at the time of modifying the cluster segment(s) is defined as "7").

2-1-5. Grouping Unit 108

The grouping unit 108 is an example of the modification unit according to the present disclosure. The grouping unit 108 groups a character string group on the basis of a determination result relating to the modification of the cluster segments (performed by the modification unit 106) and a setting reference relating to the cluster segment(s) that is stored in the storage unit 122. For example, in a case where modifying the cluster segment(s) of the character string group before modification is determined by the modification unit 106, the grouping unit 108 modifies the cluster segment(s) of the character string group before modification so that the character string group after modification satisfies the setting reference.

2-1-5-1. Joining of Cluster Segments

For example, in a case where making large the cluster segment(s) of the character string group before modification is determined, the grouping unit 108 first selects one or more sets of a plurality of the cluster segments which are joining targets, on the basis of the setting reference, and thereafter, joins all of the cluster segments included in the sets for each set that has been selected.

As an example, the grouping unit 108 joins cluster segments that are adjacent to each other in the character string group before modification.

Additionally, the grouping unit 108 selects, as a joining target, one or more sets of the cluster segment that includes modality included in the character string group before modification and one or more cluster segments that does not include modality, and thereafter, joins all of the cluster segments included in the set, for each of the selected sets. For example, in a case where the language of the character string group is Japanese, and the individual cluster segments relating to the character string group before modification is a phrase, the grouping unit 108 first selects, as a joining target, a set of a phrase that includes modality included in the character string group before modification and all of the phrases that do not include modality positioned ahead of the phrase included in the character string group. Thereafter, the grouping unit 108 joins all of the phrases included in the set, for each of the selected sets.

Additionally, the grouping unit 108 joins the plurality of cluster segments on the basis of the relationships among the plurality of cluster segments. For example, the grouping unit 108 joins the cluster segments that have a syntactic relationship in the character string group before modification.

Additionally, the grouping unit 108 selects, as a set of a joining target, each of a predetermined number of cluster segments, from the head of the character string group before modification, and joins all of the cluster segments included in the set, for each of the selected sets.

2-1-5-2, Division of Cluster Segment(s)

Further, in a case where the modification unit 106 determines to make small the cluster segment(s) of the character string group before modification, the grouping unit 108 first selects one or more cluster segments as dividing targets on the basis of the setting reference, and thereafter, divides each of the selected cluster segments into two or more cluster segments.

For example, in a case where the language of the character string group is English, the grouping unit 108 divides the cluster group, into each of the cluster segments that are selected as the dividing targets, so that the number of words included in the individual cluster segments that are to be divided from the cluster segment are almost equal. In contrast, in a case where the language of the character string group is Japanese, the grouping unit 108 divides the cluster group, into each of the cluster segments that are selected as dividing targets, so that the number of phrases included in the individual cluster segments that are to be divided from the cluster segment is almost equal.

2-1-5-3. Cluster Segment of New Character String Group

Further, regarding a case where a character string group is newly acquired, the grouping unit 108 determines cluster segments of a newly acquired character string group on the basis of the latest setting reference that is stored in, for example, the storage unit 122. In other words, all of the character string group after addition (i.e. the character string group before modification and the newly acquired character string group) are grouped on the basis of the same setting reference.

2-1-6. Display Controller 110

The display controller 110 performs control to cause the terminal 20 to display an acquired character string group. For example, the display controller 110 causes the character string group to be displayed on a display screen (of the terminal 20) by dividing the character string group into each of the cluster segments that are grouped by the grouping unit 108.

Further, in a case where the modification unit 106 determines to modify the cluster segments of the character string group before modification, the display controller 110 is also able to display the cluster segment(s) that has been modified (joined or divided) in a highlighted manner on the display screen. For example, the display controller 110 may display a different display color for the cluster segment(s) that have been modified, from a default display color (in other words, a display color for the cluster segment(s) that have not been modified). It is to be noted that a more specific content is described later with reference to FIG. 10.

Additionally, in a case where the plurality of cluster segments are joined, for example, the display controller 110 may display a joined cluster segment in such a manner that the locations of the individual cluster segments before joining are explicitly indicated. As an example, the display controller 110 may display a dashed line at a relevant location in a display region of the cluster segments after joining, or alternatively, the display controller 110 may deform and display the relevant location or the vicinity thereof into another form (for example, a narrowed form).

Additionally, in a case where one or more cluster segments are modified, the display controller 110 may display an animated cartoon that indicates the modification of relevant cluster segments. For example, in a case where the plurality of cluster segment(s) relating to the character string group before modification are joined, the display controller 110 may display an animated cartoon in which the plurality of cluster segments gradually move close to each other and joined. Further, in a case where one cluster segment is divided into two or more cluster segments, the display controller 110 may display an animated cartoon in which the cluster segment before the division gradually becomes divided and two or more cluster segments are formed accordingly.

2-1-7. Communication Unit 120

The communication unit 120 transmits and receives information to and from another device via the communication network 22. For example, the communication unit 120 receives, from the terminal 20, speech data or a character string group that is manually inputted. Further, the communication unit 120 transmits, to the terminal 20, control information that controls to display an acquired character string group by dividing an acquired character string group into each cluster segment.

2-1-8. Storage Unit 122

The storage unit 122 stores various types of data and various types of software. For example, the storage unit 122 associates the acquired character string group with the cluster segment(s) relating to the character string group, and (temporarily) stores them. Further, as illustrated in FIG. 4, the storage unit 122 may store the setting reference table 124. It is to be noted that the setting reference table 124 may be stored in another device (unillustrated) that is able to communicate with the server 10, instead of being stored in the storage unit 122.

2-2. Application Examples

The configuration according to the present embodiment is described as above. Next, application examples of the present embodiment are described with reference to FIGS. 6 to 14. It is to be noted that a description is given here of an example in which a user speaks (speech input) each of portions of the character string group 30 illustrated in FIG. 2 to the terminal 20.

2-2-1. Speech 1

Figure 6:
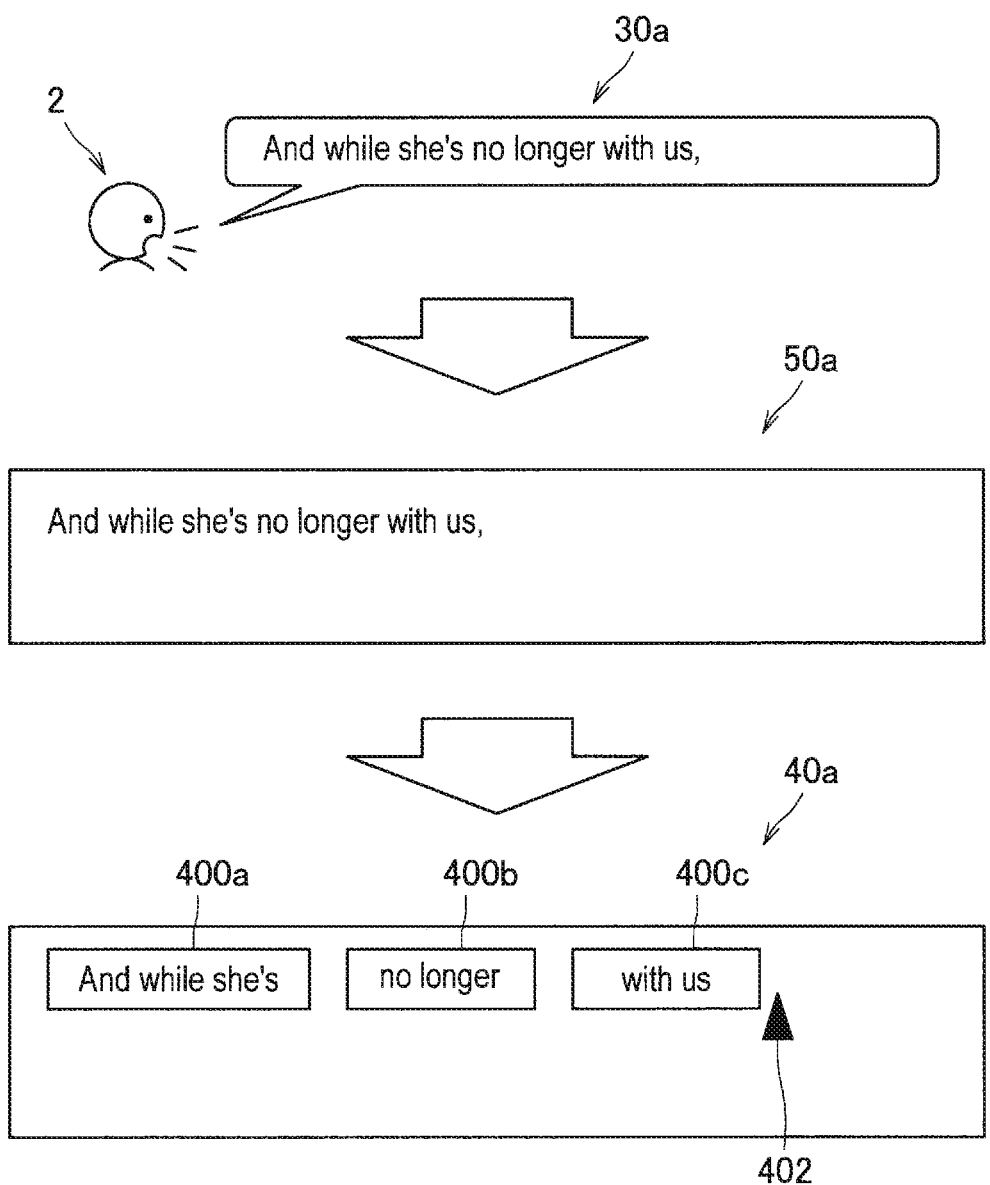
FIG. 6 is a diagram describing a portion of an application example of an embodiment of the present disclosure.

For example, as illustrated in FIG. 6, the user first perform a speech 30a of "And while she's no longer with us," to the terminal 20. In this case, the terminal 20 transmits collected sound data to the server 10. Thereafter, the speech recognition unit 102 of the server 10 performs speech recognition on the received speech data to convert the data into a character string group.

Next, the language processing unit 104 performs various types of language processing on the character string group. Thereafter, the grouping unit 108 groups the character string group on the basis of an analysis result of the character string group performed by the language processing unit 104 and a setting reference relating to cluster segment(s) that is stored, for example, in the storage unit 122 in advance, Thereafter, the display controller 110 divides the character string group into each of cluster segments 400 that are grouped by the grouping unit 108 (for example, by enclosing with frames, as illustrated in FIG. 6), and causes the character string group (of the terminal 20) to be displayed on a display screen.

Further, as illustrated in FIG. 6, the display controller 110 may further display a caret 402 indicating a current input location behind a cluster segment 400c that is located at the end. In this case, the user is able to add any character string (for example, ",", ".", and the like) at a location where the caret 402 is displayed, by way of a manual input to the terminal 20, for example. Further, the user also moves the caret 402 to a location of the cluster segment that, for example, is hoped to be modified, and selects the cluster segment, to thereby make it possible to edit the cluster segment. For example, the user deletes the cluster segment or speaks again only the cluster segment, to thereby make it possible to modify the character string group that corresponds to the cluster segment. Accordingly, the user is able to easily edit the relevant character string group.

2-2-2. Speech 2

Figure 7:
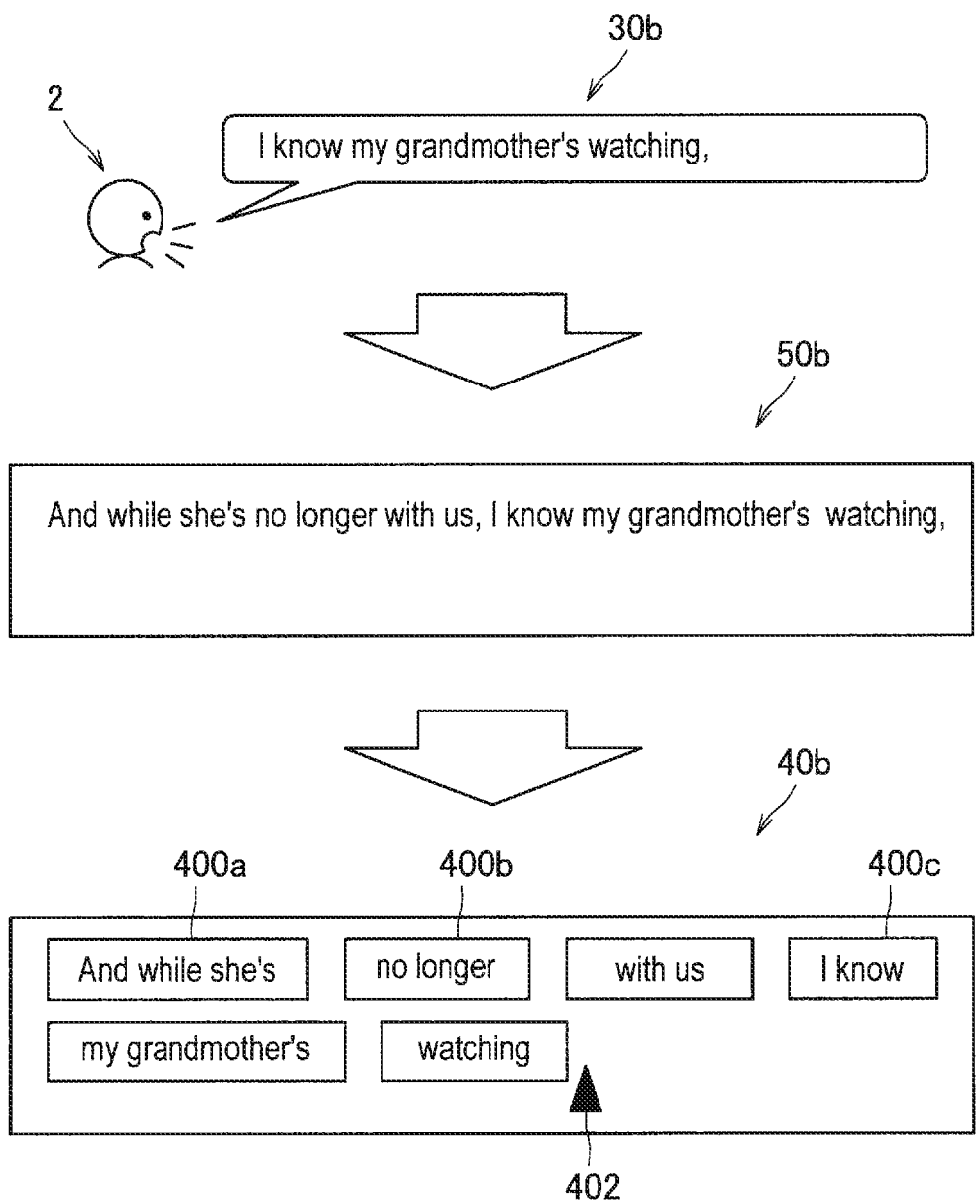
FIG. 7 is a diagram describing a portion of an application example of an embodiment of the present disclosure.

Thereafter, as illustrated in FIG. 7, the user performs a speech 30b of "I know my grandmother's watching," to the terminal 20. In this case, similarly to the example illustrated in FIG. 6, the terminal 20 transmits collected speech data to the server 10. Thereafter, the speech recognition unit 102 of the server 10 performs speech recognition on the received speech data, and converts the data into a character string group. Thereafter, the language processing unit 104 performs various types of language processing on a newly acquired character string group (from the speech recognition unit 102) (i.e. the character string group corresponding to the speech 30b).

Thereafter, the modification unit 106 specifies a condition satisfied by the character string group that has been acquired in the past, i.e. the character string group 50*a* illustrated in FIG. 6, among the plurality of conditions. Next, the modification unit 106 specifies a condition satisfied by the character string group in which the newly acquired character string group has been added to the character string group 50*a*, i.e. the character string group 50*b* illustrated in FIG. 7. Thereafter, the modification unit 106 compares the specified two conditions. It is to be noted that, in the example illustrated in FIG. 7, the two conditions are the same. In this case, the modification unit 106 determines not to modify the cluster segments of the character string group 50*a* before the addition.

Thereafter, the grouping unit 108 determines cluster segments of the newly acquired character string group with use of the same setting reference as that of the example illustrated in FIG. 6. Thereafter, as illustrated in FIG. 7, these cluster segments (for example, the cluster segment 400*c*, etc.) are additionally displayed on the display screen 40.

2-2-3. Speech 3

Thereafter, as illustrated in FIG. 8, the user performs a speech 30*c* of "along with the family that made me who I am." to the terminal 20. It is to be noted that, in this case, the condition satisfied by the character string group 50*b* that has been acquired in the past (illustrated in FIG. 7) is the same as the condition satisfied by the character string group 50*c* after the addition of the newly acquired character string group (i.e. the character string group corresponding to the speech 30*c*). Therefore, the cluster segments of the character string group Sob before the addition are not modified. Further, the newly acquired character string group is grouped with use of the same setting reference as that of the example illustrated in FIG. 6. Thereafter, as illustrated in FIG. 8, these cluster segments are additionally displayed on the display screen 40.

2-2-4. Speech 4

Figure 9:
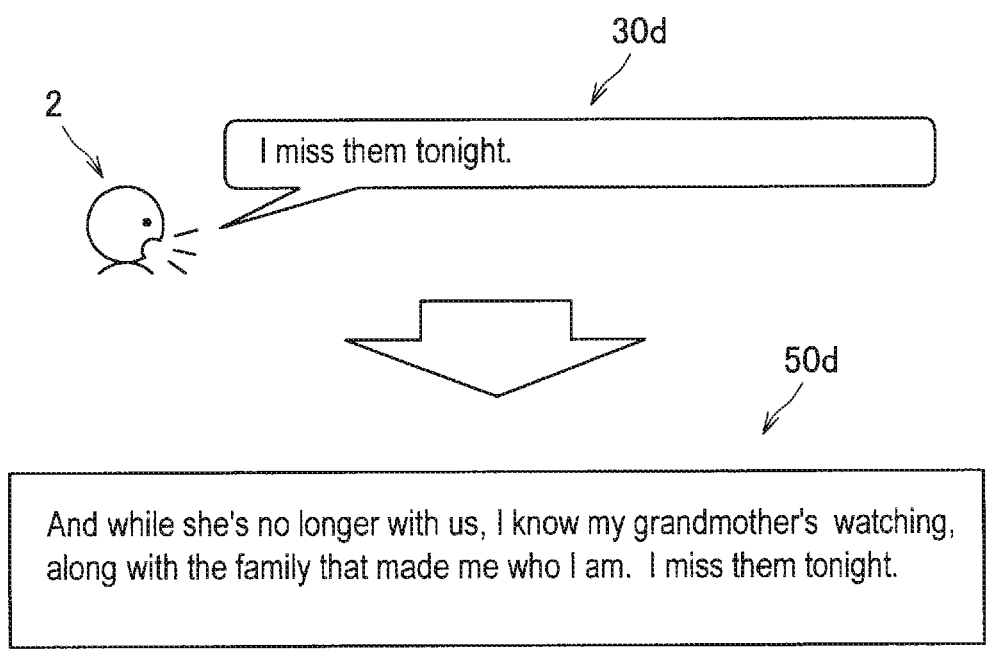
FIG. 9 is a diagram describing a portion of an application example of an embodiment of the present disclosure.

Thereafter, as illustrated in FIG. 9, the user performs a speech 30*d* of "I miss them tonight." to the terminal 20. It is to be noted that, in this case, the condition satisfied by the character string group 50*c* that has been acquired in the past (illustrated in FIG. 8) is different from the condition satisfied by the character string group Sod after the addition of the newly acquired character string group (i.e. the character string group corresponding to the speech 30*d*). In other words, the volume of the character string group Sod after the addition (for example, the number of characters, the estimated number of cluster segments, and the like) is no less than a predetermined volume.

In this case, the modification unit 106 of the server 10 determines to make large the cluster segment(s) of the character string group 50*c* before the addition and to modify the setting reference relating to the cluster segment(s). Thereafter, the modification unit 106 updates the setting reference relating to the cluster segments which is stored in the storage unit 122. Next, the grouping unit 108 modifies the cluster segments of the character string group 50*c* before modification on the basis of the setting reference after modification. Further, the grouping unit 108 determines the cluster segments of the newly acquired character string group on the basis of the setting reference after modification.

Figure 10:
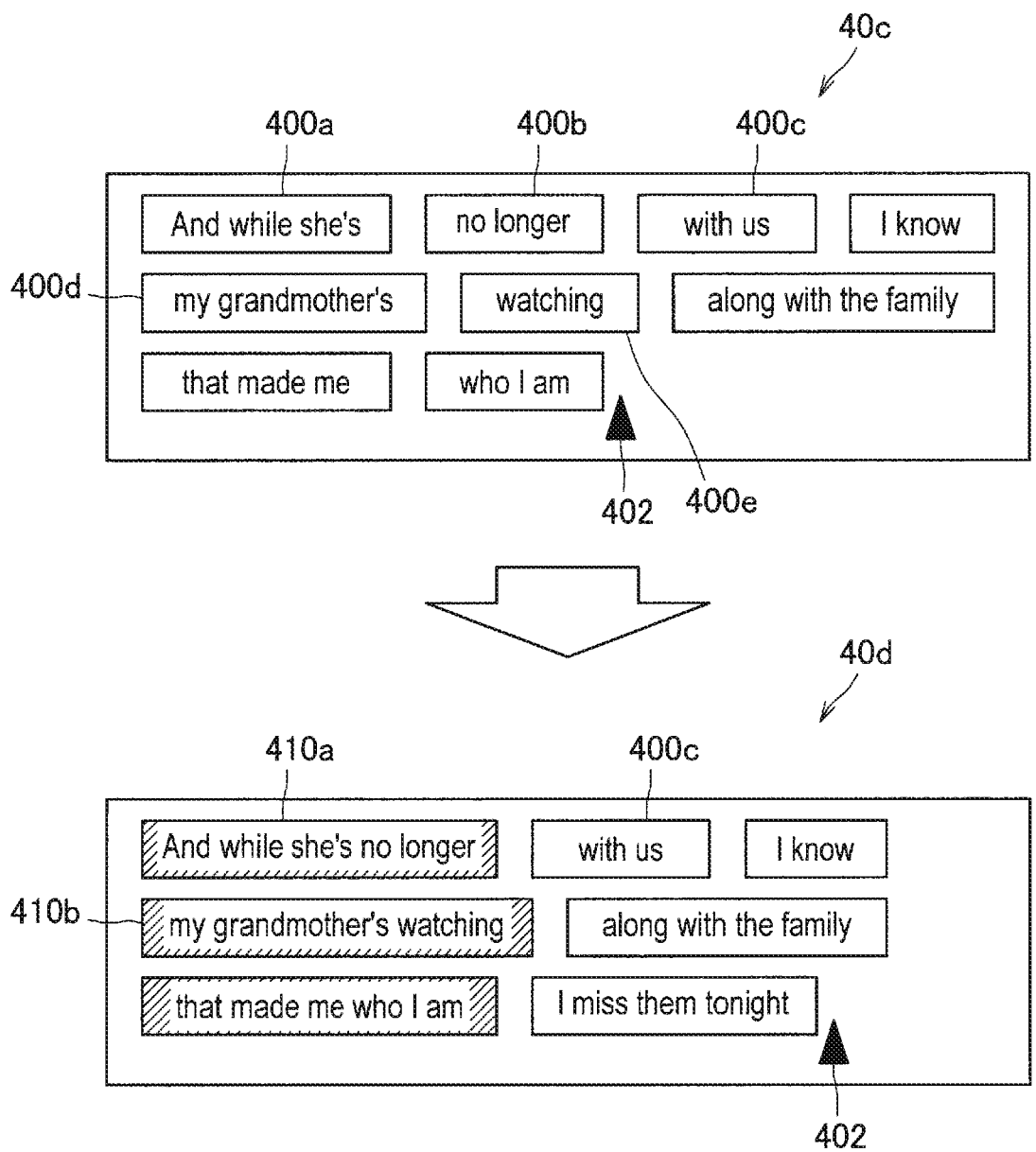
FIG. 10 is a diagram describing a portion of an application example of an embodiment of the present disclosure.

FIG. 10 is a diagram illustrating a display modification example in which the cluster segments of the character string group 50*c* before the addition has been modified. As illustrated in FIG. 10, the display controller 110 modifies, on the basis of the modification of the cluster segments, a display from a display screen 40*c* (illustrated in FIG. 8) to a display screen 40*d* on which the modification has been reflected. For example, as illustrated in FIG. 10, a cluster segment 410*a* is displayed in place of a cluster segment 400*a* and a cluster segment 400*b* (in the character string group 50*c* before the addition). Similarly, a cluster segment 410*b* is displayed in place of a cluster segment 400*d* and a cluster segment 400*e* (in the character string group 50*c* before the addition). In this way, in a case where the total volume of the acquired character string group is no less than a predetermined volume, some cluster segments become large. Therefore, the user is able to perceive the display as if the sizes of the individual cluster segments change little on the display screen 40 (as compared to the display before the increase of the character string group). Accordingly, it is possible to maintain the visibility of the entire character string group.

Further, it is possible, for example, for the user to modify the character string group corresponding to the cluster segments by speaking again only cluster segment(s) that are hoped to be modified. In other words, it is unnecessary to input the entire character string group that has been inputted, from the beginning again.

2-2-5. Speech 5

Thereafter, as illustrated in FIG. 11, the user performs a speech 30*e* of "I know that my debt to them is beyond measure." to the terminal 20. It is to be noted that, in this case, the condition satisfied by the character string group 50*b* that has been acquired in the past (illustrated in FIG. 9) is the same as the condition satisfied by the character string group 50*e* after the addition of the newly acquired character string group (i.e. the character string group corresponding to the speech 30*c*). Therefore, the cluster segments of the character string group 50*d* before the addition are not modified. Further, the newly acquired character string group is grouped with use of the same setting reference as that of the example illustrated in FIG. 9. Thereafter, as illustrated in FIG. 11, these cluster segments are additionally displayed on the display screen 40.

2-2-6. Speech 6

Thereafter, as illustrated in FIG. 12, the user performs a speech 30*f* of "To my sister Maya, my sister Alma, all my other brothers and sisters," to the terminal 20. It is to be noted that, in this case, the condition satisfied by the character string group 50*e* that has been acquired in the past (illustrated in FIG. 11) is the same as the condition satisfied by the character string group 50*f* after the addition of the newly acquired character string group (i.e. the character string group corresponding to the speech 30*f*). Therefore, the cluster segments of the character string group 50*e* before the addition are not modified. Further, the newly acquired character string group is grouped with use of the same setting reference as that of the example illustrated in FIG. 9. Thereafter, as illustrated in FIG. 12, these cluster segments are additionally displayed on the display screen 40.

2-2-7. Speech 7

Figure 13:
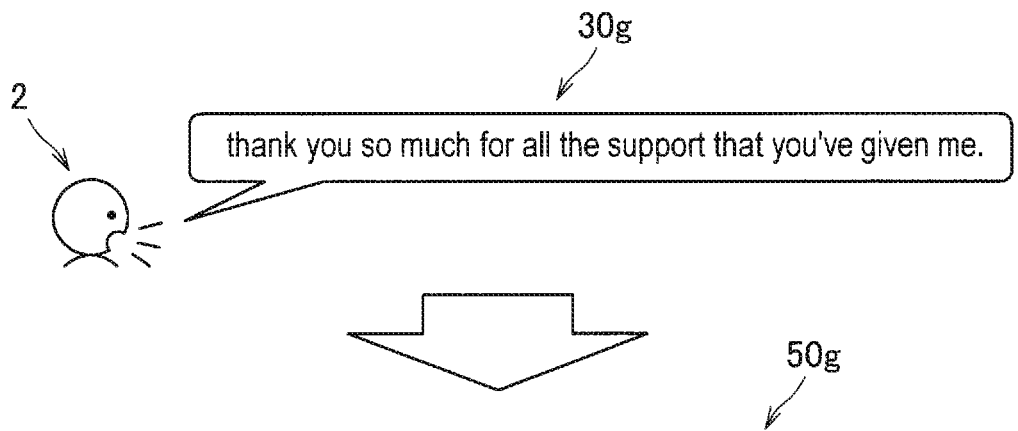
FIG. 13 is a diagram describing a portion of an application example of an embodiment of the present disclosure.

Thereafter, as illustrated in FIG. 13, the user performs a speech 30*g* of "thank you so much for all the support that you've given me." to the terminal 20. It is to be noted that, in this case, the condition satisfied by the character string group 50c that has been acquired in the past (illustrated in FIG. 12) is different from the condition satisfied by the character string group 50g after the addition of the newly acquired character string group (i.e. the character string group corresponding to the speech 30g). In other words, the volume of the character string group 50g after the addition further increases, by no less than a predetermined volume, from the character string group in which the size of the cluster segments has been modified most recently (specifically, the character string group 50d illustrated in FIG. 9).

In this case, the modification unit 106 of the server 10 determines to make large the cluster segment(s) of the character string group 50f before the addition and to modify the setting reference relating to the cluster segment(s). Thereafter, the modification unit 106 updates the setting reference relating to the cluster segments which is stored in the storage unit 122. Next, the grouping unit 108 modifies the cluster segments of the character string group 50c before modification on the basis of the setting reference after modification. Further, the grouping unit 108 determines the cluster segments of the newly acquired character string group on the basis of the setting reference after modification.

Figure 14:
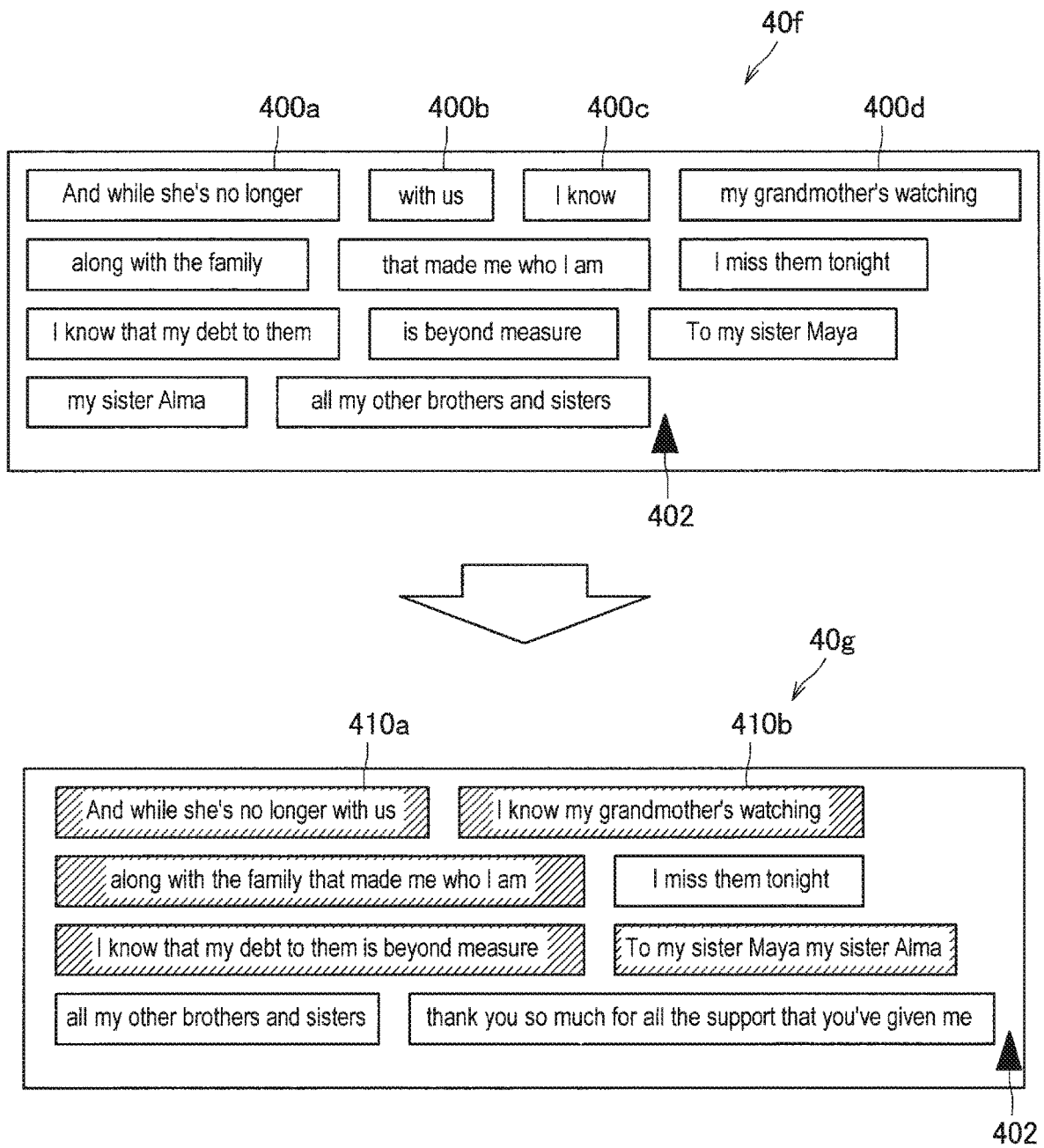
FIG. 14 is a diagram describing a portion of an application example of an embodiment of the present disclosure.

FIG. 14 is a diagram illustrating a display modification example in which the cluster segments of the character string group 50f before the addition has been modified. As illustrated in FIG. 14, the display controller 110 modifies, on the basis of the modification of the cluster segments, a display from a display screen 40f (illustrated in FIG. 12) to a display screen 40g on which the modification has been reflected. For example, as illustrated in FIG. 14, a cluster segment 410a is displayed in place of a cluster segment 400a and a cluster segment 400b (in the character string group 50f before the addition). In this way, in a case where the total volume of the acquired character string group is no less than a predetermined volume, some cluster segments become large. Therefore, it is possible to maintain the visibility of the entire character string group.

2-3. Operation

As described above, the application examples according to the present embodiment are described. Next, a description is given of operation according to the present embodiment with reference to FIGS. 15 and 16. It is to be noted that a description is given here of an operation example in a scene in which the user performs a speech input by speaking a character string group to the terminal 20. It is to be noted that the present operation is repeated each time the user activates a speech input application, for example.

2-3-1. Entire Flow of Operation

Figure 15:
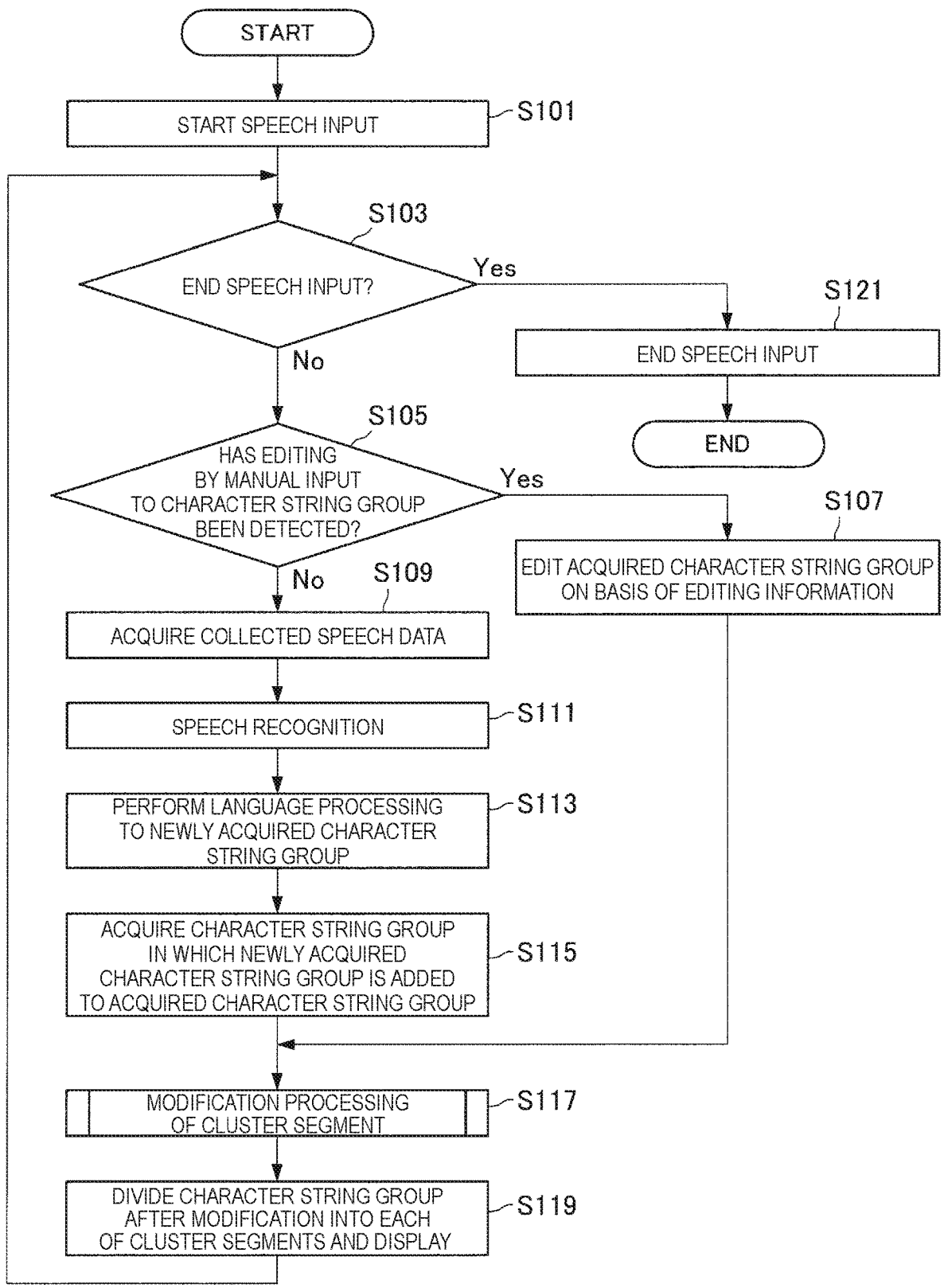
FIG. 15 is a flowchart illustrating a flow of operation according to an embodiment of the present disclosure.

FIG. 15 is a flowchart illustrating an entire flow of operation according to the present embodiment. As illustrated in FIG. 15, the terminal 20 first activates a speech input application on the basis of predetermined operation performed by the user to the terminal 20, for example. Thereafter, the sound collection unit 200 starts collecting sounds (S101).

Thereafter, during operation of ending the speech input not having been done (S103: No), the following processing of S105 to S119 is repeated. Specifically, first, in a case where editing on a character string group (that has been inputted) by way of a manual input is detected (S105: Yes), the terminal 20 transmits editing information indicating the editing content to the server 10. Thereafter, the server 10 edits the character string group that has been acquired at the present time on the basis of the received editing information (S107). Thereafter, the server 10 performs processing of later-described S117.

In contrast, in a case where the editing by way of the manual input is not detected (S105: No), the terminal 20 transmits speech data that are collected by the sound collection unit 200 to the server 10 (S109).

Thereafter, the speech recognition unit 102 of the server 10 performs speech recognition on the speech data received in S109, and converts the data into a character string group (S111).

Next, the language processing unit 104 performs language processing on the character string group acquired in S111 (S113).

Next, in a case where a character string group that has been acquired in the past (i.e. after S101 and before the most recent S111), the language processing unit 104 acquires a character string sequence in which the character string group that has been acquired in S111 is added to the acquired character string group (i.e. a character string group after modification) (S115).

Thereafter, the server 10 performs later-described "modification processing of cluster segment(s)" (S117).

Thereafter, the display controller 110 causes the character string group after modification in S115 or S107 to be displayed on the terminal 20 by dividing the character string group into each of cluster segments that has been determined in S117 (S119). Thereafter, the processing of S103 is performed again.

It is to be noted that, in S103, in a case where the operation of ending the speech input is done (S103: Yes), the terminal 20 causes the sound collection unit 200 to end collecting sounds, and ends the speech input application (S121). Thereafter, the present operation ends.

2-3-2. Modification Processing of Cluster Segments

Figure 16:
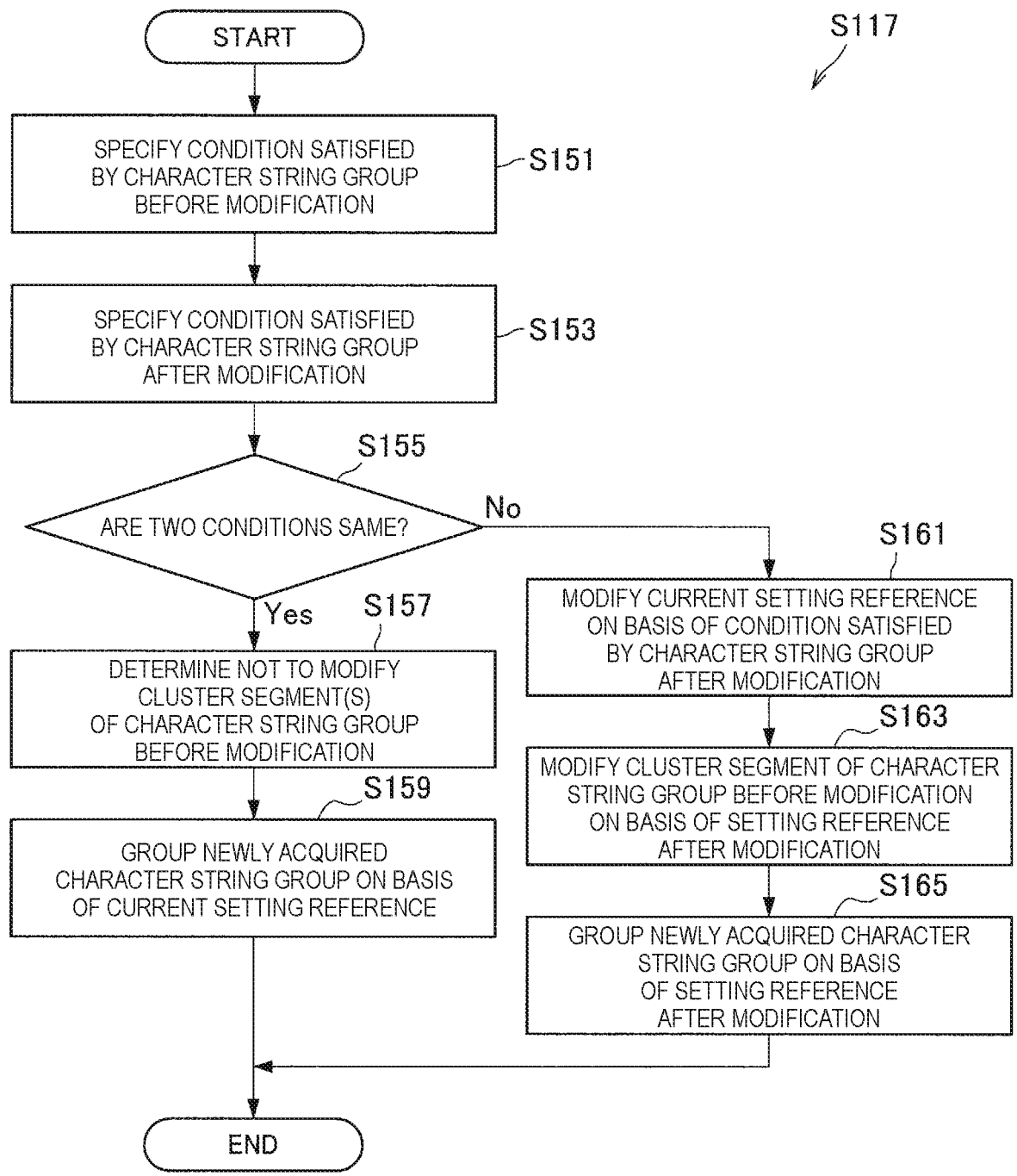
FIG. 16 is a flowchart illustrating a flow of "modification processing of cluster segment" according to an embodiment of the present disclosure.

Next, a description is given in detail of a flow of "modification processing of cluster segment(s)" in S117 with reference to FIG. 16. As illustrated in FIG. 16, the modification unit 106 first specifies a condition satisfied by the character string group that has been acquired in the most recent S115 or before S107 (i.e. the character string group before modification) among a plurality of conditions that are set in advance (S151).

Next, the modification unit 106 specifies a condition satisfied by the character string group after modification in S115 or S107 among the plurality of conditions (S153).

Thereafter, the modification unit 106 determines whether or not the condition specified in S151 is the same as the condition specified in S153 (S155). In a case where these conditions are the same (S155: Yes), the modification unit 106 determines not to modify the cluster segments of the character string group before the modification (S157). Next, the grouping unit 108 determines cluster segments for the character string group that has been acquired in the most recent S111 (i.e. a newly acquired character string group) on the basis of a setting reference relating to the cluster segments that is stored in, for example, the storage unit 122 (S159). This allows all of the cluster segments for the character string group after modification to be settled.

In contrast, in a case where these conditions are different from each other in S155 (S155: No), the modification unit 106 modifies the setting reference relating to the cluster segment(s) that is stored in, for example, the storage unit 122, on the basis of the condition specified in S153 (i.e. the condition satisfied by the character string group after modification), and updates the content of the storage unit 122 (S161).

Next, the grouping unit 108 modifies the cluster segments of the character string group before modification on the basis of the setting reference that has been modified in S161 (S163).

Thereafter, the grouping unit 108 determines the cluster segments for the character string group that has been acquired in the most recent S111 on the basis of the setting reference that has been modified in S161 (S165). This allows all of the cluster segments for the character string after modification to be settled.

2-3-3. Modification Example

It is to be noted that the operation according to the present embodiment is not limited to the above-described examples. For example, FIG. 15 describes the operation example in which the user repetitively inputs the character string group by way of a speech input; however, the operation according to the present embodiment is not limited to the example. For example, the above-described operation example may be generally applied, in a similar manner, to a scene in which the user repetitively inputs the character string group by a manual input such as a key input. In this case, in S109, for example, the terminal 20 transmits a manually inputted character string group to the server 10. In addition, the processing of S111 is omitted.

2-4. Effects

As described above, according to the present embodiment, the server 10 dynamically modifies the cluster segment(s) of the character string group that has been acquired on the basis of, for example, a speech input, a manual input, and the like, on the basis of a predetermined condition. This makes it possible to sequentially optimize the cluster segment(s) in accordance with the total volume of the character string group (for example, the number of characters, etc.).

For example, in a case where the character string group that has been acquired in the past (in a case where a character string group is newly added or deleted), the server 10 dynamically modifies the size of the cluster segment(s) of the character string group before modification, in accordance with the modification. Therefore, even when the total volume of the character string group increases or decreases, the user is still able to perceive the display as if the sizes of the individual cluster segments on the display change little. Accordingly, it is possible to maintain the visibility of the entire character string group.

Further, in a case where the user hopes to modify a portion of the character string group that has been inputted, the user is able to easily modify the character string group that corresponds to the cluster segments by speaking again only the cluster segments that is hoped to be modified from among the cluster segments that are displayed on a display screen. In other words, it is unnecessary to speak again or manually input from the beginning the entire character string group that has been inputted, and thus, user convenience is high.

3. HARDWARE CONFIGURATION

Figure 17:
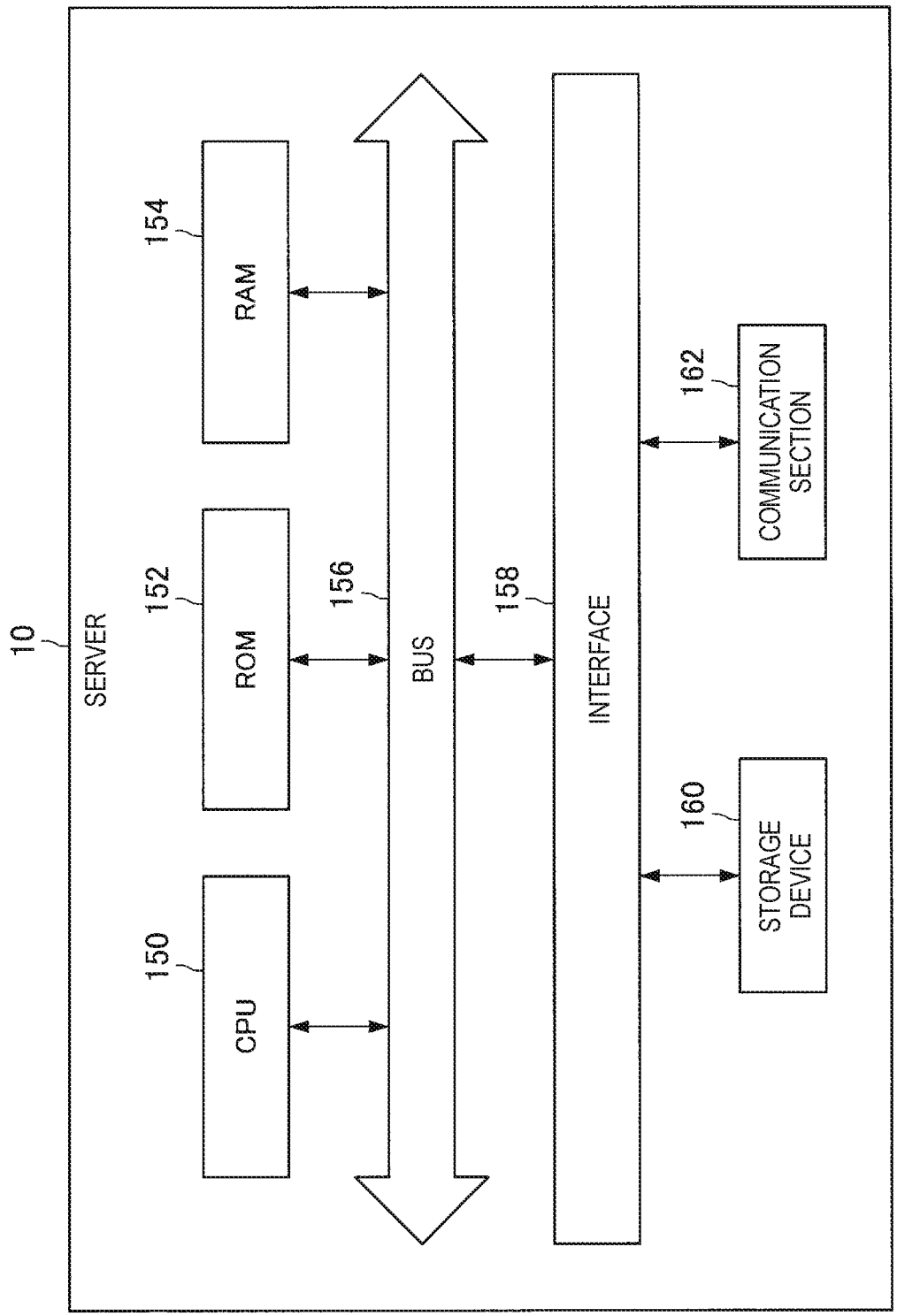
FIG. 17 is a diagram describing a hardware configuration example of the server 10 according to an embodiment of the present disclosure.

A description is given next of a hardware configuration of the server 10 according to the present embodiment with reference to FIG. 17. As illustrated in FIG. 17, the server 10 includes a CPU 150, ROM (Read Only Memory) 152, RAM 154, a bus 156, an interface 158, a storage device 160, and a communication section 162.

The CPU 150 functions as arithmetic operation processor and a control device, and controls the entire operation in the server 10 in accordance with various programs. Further, the CPU 150 achieves the function of the controller 100 in the server 10. It is to be noted that the CPU 150 includes a processor such as a microprocessor.

The ROM 152 stores control data such as programs, operation parameters, etc. that are used by the CPU 150.

The RAM 154 temporarily stores the programs executed by the CPU 150, for example.

The bus 156 includes a CPU bus, etc. The bus 156 is mutually connected to the CPU 150, the ROM 152, and the RAM 154.

The interface 158 connects the storage device 160 and the communication section 162 with the bus 156.

The storage device 160 is a data storage device that serves as the storage unit 122. The storage device 160 includes, for example, a storage medium, a recording device that causes data to be recorded in the storage medium, a reading device that reads the data from the storage medium, or a deleting device that deletes the data that are recorded in the storage medium, and the like.

The communication section 162 is a communication interface that includes a communication device, etc. that is connected to the communication network 22, for example. Further, the communication section 162 may be a wireless LAN-compatible communication section, an LTE (Long Term Evolution)-compatible communication section, or a wired communication section that performs wired communication. The communication section 162 serves as the communication unit 120.

4. MODIFICATION EXAMPLE

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

4-1. Modification Example 1

For example, in the above-described embodiment, the example is described in which, even in a case where the character string group that has been acquired in the past has been deleted, the server 10 dynamically modifies (divides) the cluster segment(s) of the character string group; however, this is not limitative. For example, in a case where the character string group that has been acquired in the past is deleted by the user and a specific condition is satisfied, the server 10 may maintain the cluster segment of the character string group.

As an example, in a case where a situation is predicted in advance in which a character string group having the same volume as the character string group to be deleted (for example, the number of characters, the estimated number of the cluster segment(s), and the like) is to be newly inputted after the deletion, the server 10 may maintain the cluster segment(s) of the character string group (before the deletion) even when the character string group has been deleted. It is to be noted that the example in which the situation is predicted in advance in which the character string group having the same volume is inputted may be an example in which a situation is estimated in which the user is improving the character string group within a predetermined time period. In addition, the example in the case where the improvement by the user is estimated may be a case in which the user has deleted or modified some characters from the character string group before the deletion within a predetermined time period.

Further, also when the user inputs designated information to maintain the cluster segment(s) before or during the deletion of the character string group, for example, the server 10 may maintain the cluster segment(s) of the character string group (before the deletion) even when the character string group has been deleted. It is to be noted that the designated information may be inputted by means of, for example, a predetermined input to the display screen, a predetermined speech command input, and the like.

4-2. Modification Example 2

4-2-1. Sentence

Further, in the above-described embodiment, the examples are described in which the cluster segment(s) are configured basically on a word basis (for example, on a word basis in a case where the language is English, etc., and on a phrase basis in a case where the language is Japanese), however, the present disclosure is not limited to the examples. For example, the cluster segment(s) may be configured on a sentence basis. In this case, in a case where the server 10 determines to make large the cluster segment(s) of the character string group, for example, the server 10 may join each of adjacent two sentences with each other in a relevant character string group.

In addition, the server 10 may determine sentences as a joining target on the basis of semantic relevance between the adjacent sentences. For example, the server 10 may determine that the sentences having higher semantic relevance are preferentially set as the joining target.

In addition, in a case where there are a plurality of users, the server 10 may determine sentences as the joining target in accordance with the user who has spoken (inputted) the sentences. For example, in a case where the same user has spoken (inputted) two sequential sentences, the server 10 sets the two sentences as the joining target. Further, in a case where the user who has spoken (inputted) the two sequential sentences differs for each sentence, the server 10 does not set the two sentences as the joining target. In accordance with this determination example, when preparing meeting minutes of a meeting, for example, it is possible for staff to collectively delete or extract the sentences that have been spoken by the same person in the meeting, which leads to high convenience.

In addition, the server 10 may determine sentences of the joining target on the basis of the relationship of the users who have spoken (inputted) the two sequential sentences. For example, in a case where two users each speak one sentence, and the two users are family members or friends, the server 10 sets the two sentences as the joining target. Further, in a case where the two users are not friends, the server 10 does not set the two sentences as the joining target. It is to be noted that the individual users may be identified on the basis of, for example, identification information of the terminal 20 used by the individual users, an analysis result of collected speeches, or an account in a service of an application in use.

4-2-2. Communication

In addition, the cluster segment(s) may include, as a segment, a set of a question sentence and an answer sentence. For example, a question and an answer such as a question A and an answer B (to the question A) or a question B and an answer B (to the question B) are alternately spoken (inputted). In this case, the server 10 may set the set of the question and the answer to the question (for example, the set of the question A and the question B) as a cluster segment. It is to be noted that the question and the answer each may be a single sentence or a plurality of sentences. In accordance with the modification example, when preparing an interview article, etc., for example, it is possible for a drafter to collectively delete or extract the set of the question and the answer to the question, which leads to high convenience. It is to be noted that the question sentence and the answer sentence may be specified on the basis of, for example, an analysis result of modality included in the sentence, a result of a syntax analysis or a semantic analysis of the sentence, or an analysis result of intonations of collected speeches.

4-2-3. Topic

In addition, the cluster segment(s) may include a topic as a segment. For example, a communication is performed relating to three kinds of topics (for example, project A, project B, and project C, etc.) among a plurality of users. In this case, the server 10 may set, as the cluster segments, all of the sentences that have been spoken (inputted) by the plurality of users in relation to the topics.

4-3. Modification Example 3

Further, the configuration of the information processing system according to the present embodiment is not limited to the example illustrated in FIG. 1. For example, the server 10 is illustrated as a single server in FIG. 1; however, this is not limitative. A plurality of computers may cooperatively operate to thereby achieve the above-described functions of the server 10. Further, the terminal 20 is illustrated as a single terminal in FIG. 1; however, this is not limitative. The present information processing system may include a plurality of terminals 20.

4.4 Modification Example 4

Further, the configuration of the server 10 according to the present embodiment is not limited to the example illustrated in FIG. 4. For example, at least one of the speech recognition unit 102, the language processing unit 104, or the display controller 110 may be included in another device that is able to be communicated with the server 10 such as the terminal 20, instead of being included in the server 10.

4-5. Modification Example 5

Further, in the above-described embodiment, the example in which the information processing apparatus according to the present disclosure is the server 10 is described; however, the present disclosure is not limited to the example. For example, in the case where the terminal 20 has at least the functions of the modification unit 106 and the grouping unit 108, the information processing apparatus may be the terminal 20. In this case, the terminal 20 first transmits, to the server 10, the collected speech data or the character string group that is manually inputted. Thereafter, the terminal 20 receives, from the server 10, the character string group that has been acquired by means of the speech recognition on the speech data or various types of language processing results on the acquired character string group. Thereafter, the terminal 20 is able to execute the above-described functions of the modification unit 106 and the grouping unit 108 on the basis of these pieces of information.

In addition, the terminal 20 may include all of the constituent elements included in the above-described controller 100. In this case, the server 10 may not be necessarily provided.

4-6. Modified Example 6

Further, the steps in the operation of the embodiment described above are not necessarily to be executed in the described order. In one example, the steps may be executed in the order changed as appropriate. In addition, the steps may be executed in parallel or individually in part, instead of being executed in chronological order, in addition, some of the steps described may be omitted, or an additional step may be added.

Further, according to the above-described embodiments, for example, a computer program for causing hardware such as the CPU 150, the ROM 152, and the RAM 154 to execute a function equivalent to each configuration of the server 10 according to the embodiment described above can be provided. In addition, a recording medium on which the computer program is recorded is provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
an acquisition unit that acquires a first character string group; and
a modification unit that modifies a cluster segment relating to the first character string group on the basis of the first character string group and a predetermined condition.

(2)
The information processing apparatus according to (1), in which
the predetermined condition includes a plurality of conditions that differ from one another, and
the modification unit modifies the cluster segment relating to the first character string group on the basis of which condition among the plurality of conditions is satisfied by the first character string group.

(3)
The information processing apparatus according to (1) or (2), in which
the predetermined condition includes a plurality of conditions that differ from one another,
the acquisition unit further acquires a second character string group, and
the modification unit modifies the cluster segment relating to the first character string group on the basis of which condition among the plurality of conditions is satisfied by a third character string group that is a character string group in which the second character string group is added to the first character string group.

(4)
The information processing apparatus according to (3), in which the modification unit modifies the cluster segment relating to the first character string group on the basis of a comparison of a condition that is satisfied by the first character string group among the plurality of conditions and a condition that is satisfied by the third character string group among the plurality of conditions.

(5)
The information processing apparatus according to (4), in which
the modification unit modifies the cluster segment relating to the first character string group in a case where the condition that is satisfied by the first character string group differs from the condition that is satisfied by the third character string group, and
the modification unit does not modify the cluster segment relating to the first character string group in a case where the condition that is satisfied by the first character string group is the same as the condition that is satisfied by the third character string group.

(6)
The information processing apparatus according to (4) or (5), in which
each time a character string group is newly acquired, the acquired character string group is added to the first character string group, and
the modification unit modifies the cluster segment relating to the first character string group before the addition on the basis of a comparison of a condition that is satisfied by the first character string group before the addition among the plurality of conditions and a condition that is satisfied by the first character string group after the addition among the plurality of conditions.

(7)
The information processing apparatus according to any one of (3) to (6), in which the modification unit further determines the cluster segment relating to the second character string group on the basis of a condition that is satisfied by the third character string group among the plurality of conditions.

(8)
The information processing apparatus according to any one of (1) to (7), in which
the predetermined condition includes a plurality of conditions that differ from one another,
the acquisition unit further acquires editing information for the first character string group, and
the modification unit modifies the cluster segment relating to the first character string group on the basis of a comparison of a condition that is satisfied by the first character string group among the plurality of conditions and a condition that is satisfied by a fourth character string group that is a character string group provided by the first character string group being modified on the basis of the editing information among the plurality of conditions.

(9)
The information processing apparatus according to any one of (3) to (7), in which the modification unit modifies the cluster segment relating to the first character string group on the basis of a setting reference that is associated with a condition that is satisfied by the third character string group.

(10)

The information processing apparatus according to any one of (1) to (9), in which the predetermined condition includes a condition relating to a range of the number of characters included in a character string group.

(11)

The information processing apparatus according to any one of (1) to (10), in which the predetermined condition includes a condition relating to a range of the number of cluster segments relating to a character string group.

(12)

The information processing apparatus according to any one of (1) to (11), in which the predetermined condition includes a condition relating to a range of the number of phonemes corresponding to a character string group.

(13)

The information processing apparatus according to any one of (1) to (12), in which the predetermined condition includes a condition relating to a language processing result of a character string group.

(14)

The information processing apparatus according to any one of (1) to (13), in which the modification unit joins a plurality of the cluster segments or divides one or more of the cluster segments to thereby modify the cluster segment relating to the first character string group.

(15)

The information processing apparatus according to (14), in which the modification unit joins the cluster segments that are adjacent to each other in the first character string group to thereby modify the cluster segments relating to the first character string group.

(16)

The information processing apparatus according to (14) or (15), in which the modification unit joins the cluster segment that includes modality and one or more of the cluster segments that do not include modality with each other to thereby modify the cluster segment relating to the first character string group.

(17)

The information processing apparatus according to any one of (14) to (16), in which the modification unit joins the cluster segments having a syntactic relationship to thereby modify the cluster segment relating to the first character string group.

(18)

The information processing apparatus according to any one of (1) to (17), further including:

a display controller that causes the first character string group to be displayed on a display screen, in which the display controller divides the first character string group into each of the cluster segments, and causes the cluster segments to be displayed on the display screen.

(19)

An information processing method including:

acquiring a first character string group; and modifying, by a processor, a cluster segment relating to the first character string group on the basis of the first character string group and a predetermined condition.

(20)

A program that causes a computer to function as:

an acquisition unit that acquires a first character string group; and a modification unit that modifies a cluster segment relating to the first character string group on the basis of the first character string group and a predetermined condition.

REFERENCE SIGNS LIST

10 server
20 terminal
22 communication network
100 controller
102 speech recognition unit
104 language processing unit
106 modification unit
108 grouping unit
110 display controller
120 communication unit
122 storage unit
124 setting reference table
200 sound collection unit
202 operation display unit

The invention claimed is:

1. An information processing apparatus comprising:

an acquisition unit that acquires a first character string group based on sounds detected by a microphone; and a modification unit that modifies a cluster segment relating to the first character string group on a basis of the first character string group and a predetermined condition, wherein the predetermined condition includes identification information identifying each user of a plurality of users from whom the acquisition unit acquires the first character string group, wherein the identification information further identifies one or more relationships among the plurality of users from whom the acquisition unit acquires the first character string group, and wherein the acquisition unit and the modification unit are each implemented via at least one processor.

2. The information processing apparatus according to claim 1, wherein the predetermined condition includes a plurality of possible conditions that differ from one another, and the modification unit modifies the cluster segment relating to the first character string group on a basis of which condition among the plurality of conditions is satisfied by the first character string group.

3. The information processing apparatus according to claim 1, wherein the predetermined condition includes a plurality of conditions that differ from one another, the acquisition unit further acquires a second character string group, and the modification unit modifies the cluster segment relating to the first character string group on a basis of which condition among the plurality of conditions is satisfied by a third character string group that is a character string group in which the second character string group is added to the first character string group.

4. The information processing apparatus according to claim 3, wherein the modification unit modifies the cluster segment relating to the first character string group on a basis of a comparison of a condition that is satisfied by the first character string group among the plurality of conditions and a condition that is satisfied by the third character string group among the plurality of conditions.

5. The information processing apparatus according to claim 4, wherein the modification unit modifies the cluster segment relating to the first character string group in a case where the condition that is satisfied by the first character string group differs from the condition that is satisfied by the third character string group, and the modification unit does not modify the cluster segment relating to the first character string group in a case where the condition that is satisfied by the first character string group is the same as the condition that is satisfied by the third character string group.

6. The information processing apparatus according to claim 4, wherein each time a character string group is newly acquired, the acquired character string group is added to the first character string group, and the modification unit modifies the cluster segment relating to the first character string group before the addition on a basis of a comparison of a condition that is satisfied by the first character string group before the addition among the plurality of conditions and a condition that is satisfied by the first character string group after the addition among the plurality of conditions.

7. The information processing apparatus according to claim 3, wherein the modification unit further determines the cluster segment relating to the second character string group on a basis of a condition that is satisfied by the third character string group among the plurality of conditions.

8. The information processing apparatus according to claim 1, wherein the predetermined condition includes a plurality of conditions that differ from one another, the acquisition unit further acquires editing information for the first character string group, and the modification unit modifies the cluster segment relating to the first character string group on a basis of a comparison of a condition that is satisfied by the first character string group among the plurality of conditions and a condition that is satisfied by a fourth character string group that is a character string group provided by the first character string group being modified on a basis of the editing information among the plurality of conditions.

9. The information processing apparatus according to claim 3, wherein the modification unit modifies the cluster segment relating to the first character string group on a basis of a setting reference that is associated with a condition that is satisfied by the third character string group.

10. The information processing apparatus according to claim 1, wherein the predetermined condition includes a condition relating to a range of a number of characters included in a character string group.

11. The information processing apparatus according to claim 1, wherein the predetermined condition includes a condition relating to a range of a number of cluster segments relating to a character string group.

12. The information processing apparatus according to claim 1, wherein the predetermined condition includes a condition relating to a range of a number of phonemes corresponding to a character string group.

13. The information processing apparatus according to claim 1, wherein the predetermined condition includes a condition relating to a language processing result of a character string group.

14. The information processing apparatus according to claim 1, wherein the modification unit joins a plurality of the cluster segments or divides one or more of the cluster segments to thereby modify the cluster segment relating to the first character string group.

15. The information processing apparatus according to claim 14, wherein the modification unit joins the cluster segments that are adjacent to each other in the first character string group to thereby modify the cluster segments relating to the first character string group.

16. The information processing apparatus according to claim 14, wherein the modification unit joins the cluster segment that includes modality and one or more of the cluster segments that do not include modality with each other to thereby modify the cluster segment relating to the first character string group.

17. The information processing apparatus according to claim 14, wherein the modification unit joins the cluster segments having a syntactic relationship to thereby modify the cluster segment relating to the first character string group.

18. The information processing apparatus according to claim 1, further comprising:

a display controller that causes the first character string group to be displayed on a display screen, wherein the display controller divides the first character string group into each of the cluster segments, and causes the cluster segments to be displayed on the display screen.

19. An information processing method comprising:

acquiring a first character string group based on sounds detected by a microphone; and modifying, by a processor, a cluster segment relating to the first character string group on a basis of the first character string group and a predetermined condition, wherein the predetermined condition includes identification information identifying each user of a plurality of users from whom the first character string group is acquired, and wherein the identification information further identifies one or more relationships among the plurality of users from whom the first character string group is acquired.

20. A non-transitory computer-readable storage medium having embodied thereon a program, which when executed by a computer causes the computer to execute a method, the method comprising:

acquiring a first character string group based on sounds detected by a microphone; and modifying a cluster segment relating to the first character string group on a basis of the first character string group and a predetermined condition, wherein the predetermined condition includes identification information identifying each user of a plurality of users from whom the first character string group is acquired; and wherein the identification information further identifies one or more relationships among the plurality of users from whom the first character string group is acquired.

* * * * *